United States Patent
Devaraj

(10) Patent No.: US 12,284,024 B2
(45) Date of Patent: Apr. 22, 2025

(54) MULTI-PATHWAY SATELLITE COMMUNICATION SYSTEMS AND METHODS

(71) Applicant: Planet Labs PBC, San Francisco, CA (US)

(72) Inventor: Kiruthika Devaraj, Sunnyvale, CA (US)

(73) Assignee: PLANET LABS PBC, San Francisco, CA (US)

( * ) Notice: Subject to any disclaimer, the term of this patent is extended or adjusted under 35 U.S.C. 154(b) by 0 days.

(21) Appl. No.: 18/771,718

(22) Filed: Jul. 12, 2024

(65) Prior Publication Data
US 2024/0372605 A1    Nov. 7, 2024

Related U.S. Application Data

(63) Continuation of application No. 18/533,909, filed on Dec. 8, 2023, which is a continuation of application
(Continued)

(51) Int. Cl.
*H04B 7/185* (2006.01)
*H04B 7/195* (2006.01)

(52) U.S. Cl.
CPC ..... *H04B 7/18513* (2013.01); *H04B 7/18515* (2013.01); *H04B 7/18521* (2013.01); *H04B 7/18584* (2013.01); *H04B 7/195* (2013.01)

(58) Field of Classification Search
CPC .............................................. H04B 7/185–195
See application file for complete search history.

(56) References Cited

U.S. PATENT DOCUMENTS

| 5,218,467 A * | 6/1993 | Ross ................. H04B 7/18521 398/124 |
| 7,502,382 B1 | 3/2009 | Liu et al. |

(Continued)

FOREIGN PATENT DOCUMENTS

| EP | 0833462 A2 | 4/1998 |
| EP | 3070001 A1 | 9/2016 |

(Continued)

OTHER PUBLICATIONS

Dixon, "Final Report: TDRSS Telecommunications System PN Code Analysis", Robert Gold Associates, Los Angeles, California, Aug. 31, 1976, 441 pages.

(Continued)

*Primary Examiner* — Raymond S Dean
(74) *Attorney, Agent, or Firm* — DORITY & MANNING, P.A.

(57) ABSTRACT

Systems and methods for controlling satellites are provided. In one example embodiment, a computing system can obtain a request for image data. The request can be associated with a priority for acquiring the image data. The computing system can determine an availability of a plurality of satellites to acquire the image data based at least in part on the request. The computing system can select from among a plurality of communication pathways to transmit an image acquisition command to a satellite based at least in part on the request priority. The plurality of communication pathways can include a communication pathway via which the image acquisition command is indirectly communicated to the satellite via a geostationary satellite. The computing system can send the image acquisition command to the selected satellite via the selected communication pathway. Data from the satellite can be relayed to ground-based stations via one or more relay satellites.

20 Claims, 10 Drawing Sheets

Related U.S. Application Data

No. 17/959,000, filed on Oct. 3, 2022, now Pat. No. 11,881,927, which is a continuation of application No. 17/036,893, filed on Sep. 29, 2020, now Pat. No. 11,463,158, which is a continuation-in-part of application No. 16/529,299, filed on Aug. 1, 2019, now Pat. No. 10,979,137.

(56) References Cited

U.S. PATENT DOCUMENTS

| | | | |
|---|---|---|---|
| 10,325,295 | B1 | 6/2019 | Augenstein et al. |
| 2002/0041328 | A1 | 4/2002 | LeCompte et al. |
| 2004/0158832 | A1 | 8/2004 | Chechik et al. |
| 2006/0189275 | A1 | 8/2006 | Karabinis |
| 2007/0090990 | A1 | 4/2007 | Nelson |
| 2010/0039984 | A1* | 2/2010 | Brownrigg ......... H04B 7/18584 370/316 |
| 2010/0115519 | A1 | 5/2010 | Chechik et al. |
| 2014/0039963 | A1* | 2/2014 | Augenstein ...... G06Q 10/06314 705/7.24 |
| 2014/0040282 | A1 | 2/2014 | Mann et al. |
| 2016/0034743 | A1 | 2/2016 | Squires |
| 2017/0076304 | A1 | 3/2017 | Toth et al. |
| 2017/0270639 | A1 | 9/2017 | Rousmaniere et al. |
| 2018/0062735 | A1 | 3/2018 | Gill et al. |
| 2018/0159617 | A1 | 6/2018 | Nobbe et al. |
| 2018/0220107 | A1 | 8/2018 | Williams, Jr. |
| 2018/0239948 | A1* | 8/2018 | Rutschman ............... G06T 7/20 |
| 2019/0116544 | A1 | 4/2019 | Glottmann |
| 2020/0410301 | A1* | 12/2020 | Delay ...................... G08G 3/00 |

FOREIGN PATENT DOCUMENTS

| | | | | |
|---|---|---|---|---|
| EP | 3182700 | A1 | 6/2017 | |
| EP | 3378171 | A1 | 9/2018 | |
| EP | 3381812 | A1 | 10/2018 | |
| WO | WO-0218874 | A1 * | 3/2002 | ........... G01C 11/025 |

OTHER PUBLICATIONS

Donadlson, "Integrating Communication and Navigation: Next Generation Broadcast Service (NGBS)", Workshop on Emerging Technologies for Autonomous Space Navigation, Feb. 16, 2017, Washington, D.C., 20 pages.

European Telecommunications Standards Institute, "Satellite Earth Stations and Systems (SES); Harmonized EN for Very Small Aperture Terminal (VSAT); Transmit-Only, Transmit-and-Receive, Receive-Only Satellite Earth Stations Operating in the 4 GHz and 6 GHz Frequency Bands Covering Essential Requirements under Article 3.2 of the R&TTE Directive", Candidate Harmonized European Standard (Telecommunications series), Dec. 2000, 57 pages.

Frequency Plan Satellites Homepage, "Beacon and Telemetry", http://frequencyplansatellites.altervista.org/, retrieved on Sep. 9, 2020, 6 pages.

Heckler, "TDRSS Augmentation System for Satellites", SpaceOps Conferences, May 16-20, 2016, Daejeon, Korea, 14 pages.

Hogie, "Tracking and Data Relay Satellite System Demand Access System Augmentation", NASA, 2015, 17 pages.

Inmarsat, "IsatData Pro", https://www.imnarsat.com/service/isatdata-pro/, retrieved on Sep. 9, 2020, 3 pages.

International Search Report and Written Opinion for Application No. PCT/US2021/052557, mailed Jan. 10, 2022, 16 pages.

International Search Report and Written Opinion for Application No. PCT/US2020/044759, mailed Nov. 19, 2020, 14 pages.

International Telecommunication Union, "Maximum Permissible Levels of Off-Axis e.i.r.p. Density from Earth Stations in Geostationary-Satellite Orbit Networks Operating in the Fixed-Satellite Service Transmitting in the 6 GHz, 13 GHz, 14 GHz and 30 GHz Frequency Bands", ITU Radiocommunication Sector Recommendations, Apr. 2006, 22 pages.

Kopp, "Utilizing Existing Commercial Geostationary Earth Orbit Fixed Satellite Services for Low Earth Orbit Satellite Communication Relays with Earth", New Space, vol. 7, Issue 1, Mar. 1, 2019, 12 pages.

NASA, "Space Network Users' Guide (SNUG)", Goddard Space Flight Center, Greenbelt, Maryland, Aug. 3, 2012, 577 pages.

NASA, "Tracking and Data Relay Satellite (TDRS)", nasa.gov/directorates/heo/scan/services/networks/tdrsmain, retrieved on Sep. 9, 2020, 3 pages.

National Telecommunications and Information Administration, "Regulations and Procedures for Federal Radio Frequency Management (Redbook): Chapter 5—Spectrum Standards", May 2013, 48 pages.

Orban Microwave Products, "The Basics of Quadrifilar Helix Antennas", https://orbanmicrowave.com/thebasicsofquadrifilarantennas/, retrieved on Sep. 9, 2020, 2 pages.

Phung, "Tracking and Data Relay Satellite System (TDRSS) Range and Doppler Tracking System Observation Measurement and Modeling", Goddard Space Flight Center, Greenbelt, Mary land, Sep. 1980, 226 pages.

Romanian Space Agency, "C-Band Inter-Satellite Link (Priority 2) (Artes at 5A. 054 )", http://www2.rosa.ro/index.php/en/esa/oferte-furnizori/2894-c-band-inter-satellite-linkprioritv-2-artes-at-5a054, retrieved on Sep. 9, 2020, 3 pages.

The Critical Path, "A Flight Programs and Projects Directorate Quarterly Publication: A Newsletter Published for Code 400 Employees", vol. 11, No. 2, Mar.-May 2003, 24 pages.

Zaleski, "Three Generations of Tracking and Data Relay Satellite (TDRS) Spacecraft", Boeing Customer Conference, Jun. 9, 2016, 33 pages.

\* cited by examiner

MULTI-PATHWAY SATELLITE COMMUNICATION SYSTEMS AND METHODS

RELATED APPLICATIONS

The present application is a continuation of U.S. application Ser. No. 18/533,909 having a filing date of Dec. 8, 2023, which is a continuation of U.S. application Ser. No. 17/959,000 having a filing date of Oct. 3, 2022 and issued as U.S. Pat. No. 11,881,927, which is a continuation of U.S. application Ser. No. 17/036,893 having a filing date of Sep. 29, 2020 and issued as U.S. Pat. No. 11,463,158, which is a continuation-in-part of U.S. patent application Ser. No. 16/529,299 filed on Aug. 1, 2019 and issued as U.S. Pat. No. 10,979,137. Applicant claims priority to and the benefit of each of such applications and incorporates all such applications herein by reference in its entirety.

FIELD

The present disclosure relates generally to facilitating communication with a constellation of satellites. More particularly, the present disclosure relates to systems and methods for communicating with satellites to acquire data via, for example, a near real-time communication pathway including one or more relay satellites.

BACKGROUND

A constellation of imaging satellites can be utilized to acquire imagery. The satellites can be controlled to acquire the imagery by, for example, a ground-based control center. The control center can uplink commands to the satellites and receive imagery via a satellite downlink.

SUMMARY

Aspects and advantages of embodiments of the present disclosure will be set forth in part in the following description, or can be learned from the description, or can be learned through practice of the embodiments.

One example embodiment of the present disclosure is directed to a computer-implemented method for satellite imaging. The method includes receiving, by a satellite computing system including one or more satellite computing devices, an imaging task payload associated with a priority. The imaging task payload having been generated responsive to an image acquisition command and the image acquisition command having been transmitted to the imaging satellite via a communication pathway selected from a plurality of communication pathways at least in part based on the priority. The satellite computing system includes one or more relay satellites in low-earth orbit, the imaging task payload being received from an imaging satellite. The method further comprises transmitting, by the satellite computing system, the imaging task payload to an imaging task payload receiver.

Another example embodiment of the present disclosure is directed to a computing system. The computing system includes one or more processors and one or more tangible, non-transitory, computer readable media that collectively store instructions that when executed by the one or more processors cause the computing system to perform operations. The operations include obtaining a request for image data. The request is associated with a high priority for acquiring the image data. The operations include determining a selected imaging satellite from a plurality of imaging satellites to acquire the image data based at least in part on an availability of the selected imaging satellite to acquire the image data. The operations include determining a selected communication pathway of a plurality of communication pathways for servicing the request for image data. The selected communication pathway includes an uplink communication pathway for transmitting an image acquisition command to the selected imaging satellite and a downlink communication pathway for transmitting an imaging task payload from the selected imaging satellite. The downlink communication pathway includes a communication of the imaging task payload via one or more relay satellites and sending the image acquisition command to the selected imaging satellite to service the request for image data via the selected communication pathway.

Yet another example embodiment of the present disclosure is directed to one or more tangible, non-transitory, computer readable media that collectively store instructions that when executed by the one or more processors cause the computing system to perform operations. The operations include obtaining a request for image data. The request is associated with a priority for acquiring the image data. The operations include determining a selected imaging satellite from a plurality of imaging satellites to acquire the image data based at least in part on an availability of the selected imaging satellite to acquire the image data. The operations include determining a selected communication pathway of a plurality of communication pathways for servicing the request for image data. The selected communication pathway includes an uplink communication pathway for transmitting an image acquisition command to the selected imaging satellite and a downlink communication pathway for transmitting an imaging task payload from the selected imaging satellite. If the priority is indicative of a high priority for obtaining the image data, the downlink communication pathway includes a communication of the imaging task payload via one or more relay satellites. The operations include sending the image acquisition command to the selected imaging satellite to service the request for image data via the selected communication pathway.

Other aspects of the present disclosure are directed to various methods, systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
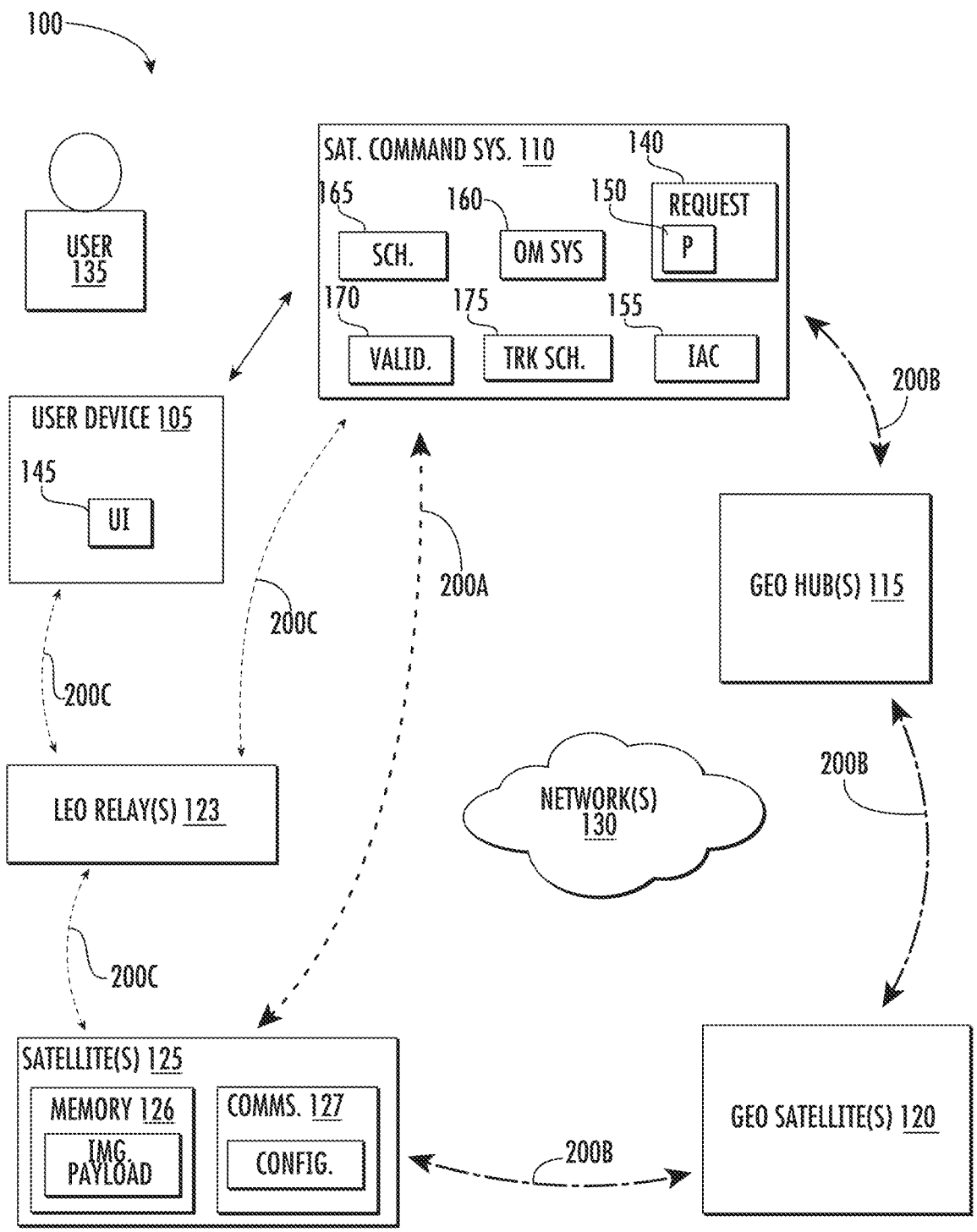
FIG. 1 depicts a block diagram of an example satellite system according to example embodiments of the present disclosure.

Example aspects of the present disclosure are directed to systems and methods for persistent, near real-time communication with satellites and the selection of various communication pathways to efficiently utilize the resources available for communicating with the satellites. For instance, an entity can provide an imaging service by which a user can request image data of a particular target (e.g., a geographic area on Earth, another planet, celestial body, portion of the universe, etc.). The request can indicate the location of the target to be imaged and can be associated with a priority. The priority can indicate, for example, how quickly the user would like to have the image data acquired by a satellite and/or delivered to the user. Based on the request, a satellite command system can determine whether any of the imaging satellites associated with the entity (e.g., owned, operated by, leased, accessible to, etc.) are available to acquire the image data of the specified target and within the given priority time constraints.

In the event a satellite is available to acquire the requested image data, the satellite command system can select a satellite (e.g., Low Earth Orbit (LEO) satellite, a Medium Earth Orbit (MEO) satellite, etc.) to acquire the image data and select an appropriate communication pathway for servicing the request for image data. A communication pathway can include an uplink communication pathway (e.g., for transmission to the imaging satellite) and a downlink communication pathway (e.g., for transmission from the imaging satellite).

In one embodiment, the selected communication pathway includes an uplink communication pathway by which to send an image acquisition command to the selected imaging satellite. For example, in the event that the user submits a higher priority request (e.g., higher than a given threshold), the satellite command system can select a communication pathway including a near-real time uplink communication pathway ("RT communication pathway") via which the image acquisition command is transmitted indirectly to the selected imaging satellite via a relay satellite (e.g., a geostationary satellite). This RT communication pathway can allow the command to be communicated to the selected imaging satellite in at least near real-time without any special pointing requirements (at any time), which may avoid tasking delays. In the event that the user submits a lower priority request, the satellite command system can select a "standard uplink communication pathway" via which the image acquisition command is transmitted directly to the selected imaging satellite (e.g., without the use of an intermediate geostationary satellite). In such a scenario, the standard uplink communication pathway may require certain satellite pointing parameters to transmit the image acquisition command to the selected imaging satellite (e.g., when the satellite is within a certain range of a ground command center).

In some examples, the selected communication pathway includes a downlink communication pathway. For instance, the downlink communication pathway can be used to transmit an imaging task payload from the selected imaging satellite to an imaging task payload receiver. The imaging task payload can include, for example, image data collected and/or captured by the selected imaging satellite. The imaging task payload can be transmitted from the selected imaging satellite to its intended destination via one or more relay satellites (e.g., a constellation or system of one or more relay satellites). In some embodiments, the relay satellites may be in a low-earth orbit. In some embodiments, the relay satellites may be in an orbit having a higher altitude than the imaging satellite(s).

In some embodiments, the destination of the imaging task payload (e.g., the destination comprising an imaging task payload receiver) is a ground-based station. For example, a selected imaging satellite may capture requested image data and store the image in the imaging task payload. The imaging task payload may be transmitted to a relay satellite in low-earth orbit (e.g., an "LEO relay" satellite). In some embodiments, the relay satellite may transmit the imaging task payload to a ground-based station for servicing the image data request. The relay satellite may, in additional embodiments, transmit the imaging task payload to one or more other relay satellites (e.g., one, two, three, or more other relay satellites; optionally also in low-earth orbit), and one of the other relay satellite(s) may transmit the imaging task payload to the ground-based station. In this manner, multiple relay satellites (e.g., two, three, or more) may be used to relay the imaging task payload to a destination. In some examples, the one or more relay satellites may relay the imaging task payload to the ground-based station to provide a quicker downlink transmission (e.g., lower latency) than would be provided by waiting for the selected imaging satellite to arrive in the appropriate position in its orbit to directly downlink to the ground-based station. In some embodiments, a downlink communication pathway including one or more relay satellites can be selected based at least in part on a determination that a request is associated with a higher priority (e.g., higher than a threshold).

In some examples, the imaging task payload may include information and/or instructions corresponding to additional image acquisition command(s), and the destination(s) of the imaging task payload may include one or more additional imaging satellites. For example, one or more additional imaging satellites may include an imaging task payload receiver. For instance, a first imaging satellite may be selected for acquiring the image data, and the first imaging satellite may acquire and/or attempt to acquire image data. If desired, the first imaging satellite can be instructed to transmit additional and/or further image acquisition command(s) to a second imaging satellite (e.g., in a "tip and cue" scheme). The first imaging satellite can transmit an imaging task payload containing the additional and/or further image acquisition command(s) (optionally also containing image data from the first imaging satellite) to one or more relay satellite(s) as described above, and the one or more relay satellite(s) may relay the imaging task payload to a second imaging satellite for further acquisition of image data (e.g., of the same or different subject of interest). Optionally, if the first imaging satellite successfully collected image data, the portion of the imaging task payload containing the successfully collected image data can be transmitted to a ground station in the manner described above. In some embodiments, multiple imaging satellites can acquire image data and successively forward the imaging task payload (e.g., optionally including the acquired image data) to maintain near real-time monitoring of a subject of interest.

Although the preceding description has referred to the relay satellite(s) as relaying transmissions in the downlink pathway, it is to be understood that the relay satellite(s) may also be used for uplink to the imaging satellite(s) to secure many of the same advantages. For example, the communication pathway(s) between the one or more relay satellite(s), the imaging satellite(s), and/or the ground-based stations can be one-way or two-way (e.g., for communication of image acquisition commands, imaging task payloads, and/or acknowledgements thereof). In one embodiment, one or more of the relay satellite(s) may be used for telemetry, tracking, and/or command (TTC) communications with one or more imaging satellites. In some embodiments, Doppler compensation can be employed in the tracking and handoff of communications between the one or more relay satellite(s) and the one or more imaging satellite(s).

The one or more relay satellite(s) of the downlink communication pathway can communicate with the imaging satellite(s) in a continuous manner or in a batch/burst manner. For example, in some embodiments, the imaging satellite(s) can always be tracked by at least one of the relay satellite(s) (e.g., with a steerable antenna array) to constantly maintain for a period of time a communication pathway is in readiness for transmissions from the imaging satellite. In some embodiments, the imaging satellite and the relay satellite(s) can communicate on a schedule, such as based on times which correspond to scheduled and/or predicted relative positions/orientations of the respective satellites.

In some embodiments, the one or more relay satellite(s), the imaging satellite(s), and/or the ground-based stations can communication using radio frequency communications and/or optical transmissions (e.g., for downlink and/or uplink).

Once the communication pathway is selected, the satellite command system can transmit the image acquisition command to the selected imaging satellite via the selected communication pathway and eventually receive the requested image data (e.g., via the downlink communication pathway of the selected communication pathway). In this way, example embodiments of the technology described herein provide multiple uplink communication pathways for communicating with one or more imaging satellite(s), as well as multiple downlink communication pathways for transmitting a payload (e.g., an imaging task payload) from the one or more imaging satellite(s). Accordingly, embodiments of systems and methods of the present disclosure provide flexibility to utilize certain pathways based on the priority of the image acquisition. Moreover, by including the RT communication pathway and/or a downlink communication pathway including one or more LEO relay satellites, the systems and methods of the present disclosure provide a low size, weight, and power (SWaP) persistent communication solution for low data rate applications (e.g., launch and early orbit operations (LEOP), time-critical satellite tasking operations, command acknowledgements, critical status reports, anomaly recovery operations, conjunction assessment and collision avoidance, etc.), as further described herein.

The systems and methods described herein provide a number of technical effects and benefits. For instance, the systems and methods of the present disclosure allow for more efficient satellite communications that reduce latency presented by communication methods that include orbital access/pointing/range requirements toward ground stations for uplink and downlink. Moreover, the communication technology described herein provides a global set of communication pathways by which an entity can persistently command its associated satellites and/or retrieve data therefrom. For example, the beams provided by the intermediate satellites (e.g., GEO satellites) can provide coverage over the entire earth and provide access to all target satellites at all times. Likewise, a system or constellation of one or more LEO relay satellites can provide wide coverage to enable selected imaging satellite(s) to transmit captured or generated data to all destinations at all times. This can allow for the near real-time adjustments to improve satellite image capture, damage mitigation (e.g., collision avoidance, etc.), trajectory correction, interference reduction, etc.

Additionally, the reduced latency associated with example embodiments of the present disclosure enable new applications of image recognition techniques to perform autonomous detection and tracking of subjects of interest for image acquisition. For instance, in some embodiments, onboard processors on one or more imaging satellites of the present disclosure can perform image recognition on images captured by the satellites. Additionally, or alternatively, the low latency communication pathway(s) can permit the images captured by one or more of the imaging satellites to be downlinked to computing systems which can further process the images using one or more additional image recognition models, including powerful machine-learned image recognition models, to generate recognition results and/or additional image acquisition commands for rapid uplink to the imaging satellites. In this manner, the low-latency communication pathway(s) of example embodiments of the present disclosure can permit one or more imaging satellites to leverage increased processing power of external computing systems to apply advanced machine-learning techniques and models.

Additionally, downlink communication pathways including relay satellites according to the present disclosure offer significant improvements over past approaches, which have typically required large numbers of costly ground stations, with associated significant costs.

Traditionally, the alternative to large numbers of ground stations is to "store and forward" data from the imaging satellites, which requires imaging satellites to store data onboard and "dump" the data during passes over a limited number of master ground stations. The "store and forward" technique generally defeats real-time earth observation and can impose limitations on the spacecraft, both in the requirement to provision substantial onboard storage and the amount of data which can be collected and distributed.

In contrast, the downlink communication pathways of the present disclosure provide for rapid communication with ground-based stations, as the transmission can be accomplished without having to wait for the imaging satellite itself to come within the portion of its orbit within transmission range of the desired ground-based station. Advantageously, the imaging data can be relayed across one or more relay satellites until a clear line of transmission can be obtained. This reduction in latency permits the memory and/or cache of the imaging and relay satellites to be used more effectively, as the image data does not need to be stored for long periods of time while the satellite(s) are orbiting. The resources on the satellite(s) are freed for completing additional tasks and/or repeating the same tasks, improving efficiency and/or accuracy of data gathered. In addition to improvements to latency, efficiency, and accuracy, the downlink communication pathways according to aspects of the present disclosure also improve the robustness of time-sensitive downlink transmissions against localized weather disruptions. For instance, by enabling rapid relaying of the imaging payload(s), an imaging satellite may be able to quickly redirect its transmission to an alternate ground-based station in the eventuality that its originally-scheduled transmission to a primary ground-based station is disrupted by inclement weather patterns.

The systems and methods of the present disclosure also provide an improvement to satellite computing technology. For instance, the computer-implemented methods and systems improve the ability to control and command satellites (e.g., for the acquisition of data such as, for example, image data) via a near real-time persistent communication pathway. For example, a computing system can obtain a request for image data. The request can be associated with a priority for acquiring the image data. The computing system can determine an availability of a plurality of satellites to acquire the image data based at least in part on the request. The computing system can determine a selected satellite from the plurality of satellites to acquire the image data based at least in part on the availability of the selected satellite. The computing system can determine a selected communication pathway of a plurality of communication pathways (e.g., including an uplink communication pathway to transmit an image acquisition command to the selected satellite) based at least in part on the priority for acquiring the image data. As further described herein, the plurality of communication pathways can include a first uplink communication pathway via which the image acquisition command is directly communicated to the selected imaging satellite (e.g., a standard uplink communication pathway) and a second uplink communication pathway via which the image acquisition command is indirectly communicated to the imaging satellite via a geostationary satellite (e.g., a near real-time persistent uplink communication pathway). The computing system can send the image acquisition command to the selected imaging satellite via the selected communication pathway. In this way, the computing system can selectively determine what communication pathway is appropriate given the priority of the request. This can save bandwidth resources of the communication pathways by aligning the pathways with the appropriate tasking. Moreover, the computing system can utilize the persistent communication pathway (without specific orbital access or pointing requirements) to transmit data to and receive data from a satellite at all times. This can allow for better communication of commands, status reports, avoidance instructions, anomaly recovery operations, etc.

Similarly, the downlink communication pathways as disclosed herein provide for quicker retrieval of captured image data, enabling the capture of successive images in real time (or nearly so). For instance, some embodiments can provide for the capture and transmission of video frame data in near real time, which is highly advantageous for nearly all satellite imaging applications.

With reference now to the FIGS., example embodiments of the present disclosure will be discussed in further detail.

FIG. 1 depicts a diagram of an example system 100 for controlling imaging satellites. For example, the system 100 can include a user device 105, a satellite command system 110, geostationary hub system(s) ("GEO hub(s)") 115, geostationary satellite(s) 120, and a plurality of satellites 125 (e.g., a constellation of imaging satellites). The system 100 can also include one or more low-earth orbit (LEO) relay satellites 123. While the description and examples provided herein refer to one or more low-earth orbit relay satellites, the one or more relay satellites can also, or alternatively, include one or more medium-earth orbit (MEO) relay satellites.

The imaging satellite(s) 125 can include a memory 126 (for storing an imaging task payload/image data, in some embodiments) and communications equipment 127, and configuration instructions for the operation thereof. In some embodiments, communications equipment 127 can include steerable antenna arrays and/or reprogrammable radio communications equipment which can be configured to communicate with the one or more LEO relay satellite(s) 123. In some examples, the configuration includes an instruction set for communicating via radio frequency communication. In some embodiments, the imaging satellite(s) 125 can include one or more computing devices, such as are described in FIG. 10. For instance, one or more computing devices of the satellite(s) 125 can execute instructions for the operation of imaging devices, communication devices, etc. In some embodiments, computing devices can include one or more image processors and/or image processing models.

These components can be configured to communicate via one or more networks 130.

The user device(s) 105 can be associated with a user 135. The satellite command system 110 can be associated with an entity that provides image data services and/or controls one or more satellite(s) 125. The GEO hub(s) 115, geostationary satellite(s) 120, and/or the imaging satellites 125 can be associated with the entity and/or a different entity (e.g., that allows for the access/use of such assets).

The user device(s) 105 can be desktop computer, laptop computer, mobile device, server system, and/or other types of user devices. The user device(s) 105 can be configured to allow a user 135 to submit a request 140 for acquiring image data. For example, the user device(s) 105 can be configured to present one or more user interfaces 145 (e.g., via one or more display devices) that allow the user 135 to provide user input to request image data. Data indicative of the user interface(s) 145 can be provided by a computing system associated with the entity (e.g., the satellite command system 110, etc.) over the network(s) 130. The user interface(s) 145 can be presented via a software application, a website, browser, etc. The user 135 can provide user input (e.g., text input, voice input, touch input, selection input, etc.) via the user interface(s) 145 to select one or more parameters associated with the requested image data. For example, the user input can specify an imaging target (e.g., a location, geographic area, building, structure, etc.). The user input can specify the imaging target based on location information (e.g., coordinates, etc.), semantic name, identifier, and/or other information that identifies the target to be imaged. In some implementations, the user input can specify a time parameter (e.g., timeframe, point in time, etc.) at which the image data of the target is preferred to be acquired. In some implementations, the user input can specify a time parameter (e.g., timeframe, point in time, etc.) by which the image data of the target is preferred to be made available to the user 135 (e.g., delivered, available for download, viewing, etc.).

The request 140 can be associated with a priority 150 for acquiring the image data. The priority 150 can be a standard priority by which it is sufficient for the image data to be acquired in a standard timeframe (e.g., over several hours). As further described herein, a standard priority can indicate that an associated image acquisition command can be placed in an imaging schedule/queue as it is received, without preferential treatment. In some implementations, the priority 150 can be an intermediate priority by which the image data is to be acquired and/or made available to the user 135 sooner than the standard timeframe. For example, as further described herein, the intermediate priority can indicate that an associated image acquisition command is to be given preferential treatment over the other pending requests (e.g., by moving the associated image acquisition command ahead of previously pending commands in a schedule/queue, by moving downlink and/or delivery time ahead in a schedule/queue, etc.). In some implementations, the priority can be a high priority, which can indicate that the requested image data is to be acquired and/or made available in a higher and/or the highest available rush manner. For example, as further described herein, a high priority can indicate that an associated image acquisition command is to be communicated to a satellite (e.g., via a particular communication pathway) in manner than expedites image acquisition and delivery.

The priority 150 associated with the request for image data can be determined in a variety of manners. In some implementations, the user 135 can select the priority 150 associated with the request 140. For example, the user interface 145 may include one or more user interface element(s) (e.g., buttons, toggles, menus, lists, fields, etc.) that allow the user 130 to select the priority 150 (e.g., standard priority, intermediate priority, high priority, etc.) associated with the request 140. In some implementations, the ability to select such an element may be based at least in part on whether the entity can meet the request with the selected priority. For example, a computing system associated with the entity (e.g., the satellite command system 110) can determine whether one or more of the plurality of satellites 125 would be available to acquire image data of the requested target in the expedited manner associated with a high priority request (e.g., based on current/future satellite location, trajectory, memory resources, etc.). In the event that the entity can meet such a prioritized request (e.g., due to satellite availability), the user interface 145 can present a user interface element and/or other option for selecting a high priority. In the event that the entity cannot meet such a prioritized request (e.g., due to satellite unavailability), the user interface 145 may not present a user interface element and/or other option for selecting a high priority (e.g., greying-out element, omitting element from user interface, etc.).

In some implementations, the priority 150 associated with a request 140 can be determined based at least in part on a time parameter associated with the request. For example, the priority 150 of the request 140 can be determined based at least in part on a time by which the user 135 specifies that the image data is to be acquired and/or made available. By way of example, in the event that the user 135 specifies that the image data should be acquired and/or made available in less than one hour, the request 140 can be associated with a high priority. In another example, in the event that the user 135 does not specify that the image data should be acquired and/or made available within a certain timeframe, the request 140 can be associated with a standard priority. Such a determination can be made, for example, by the satellite command system 110 and/or another system.

In some implementations, the priority 150 can be determined based at least in part on the user 135 and/or type of user 135. For example, in the event that the user 135 is considered a higher value customer (e.g., due to a certain subscription, purchase history, contract, etc.), the priority 150 associated with a request can be determined to be a high priority. In another example, in the event that the user 135 is associated with a type of entity that generally needs/prefers expedited image data (e.g., an emergency response entity, etc.), the priority 150 associated with a request 140 can be determined to be a high priority. Such a determination can be made, for example, by the satellite command system 110 and/or another system.

In some implementations, the priority 150 can be determined based at least in part on the target (e.g., type of target, location, etc.). For example, in event that the type of target may be subject to change at a higher rate (e.g., an area experiencing a wildfire), the priority 150 associated with a request can be determined to be a high priority. In another example, in the event that the type of target may be subject to change at a lower rate (e.g., a park undergoing a long-term reconstruction project), the priority 150 associated with a request 140 can be determined to be a high priority. In some implementations, the priority 150 may be based at least in part on the location of the target. For example, the target may include a movable and/or moving object (e.g., one or more automobiles). The target may be moving such that it will be subject to conditions that would make it more difficult to acquire image data of the target (e.g., the automobile(s) that are driving along a path that enters a tunnel). In such a case, the priority 150 associated with a request 140 can be determined to be a high priority (e.g., so that image data is acquired prior to the automobile(s) entering the tunnel). Such a determination can be made, for example, by the satellite command system 110 and/or another system.

The satellite command system 110 can be configured to obtain the request 140 for the image data from the user device(s) 105 (e.g., via the network(s) 130). The satellite command system 110 can parse the request (e.g., a data set, etc.) to determine the location of the target to be imaged and the time within which the image data is preferred to be acquired and/or made available to the user 135. As described herein, such timing can be determined based at least in part on a priority 150 and/or time parameters explicitly provided by the user 135.

The satellite command system 110 can be configured to determine an availability of the plurality of satellites 125 to acquire the image data based at least in part on the request 140. For example, the satellite command system 110 can obtain data associated with the satellites 125 (e.g., on a periodic basis, on-demand basis, on a scheduled basis, etc.) and determine whether any of the satellites 125 are available to acquire image data of the target within a timeframe that is sufficient for the request 140 (e.g., given the associated priority 150). The data associated with the satellites 125 can be indicative of various parameters associated with the satellites 125. For instance, the data associated with the satellites 125 can include a schedule indicative of the pending image acquisition commands/sequences of a given satellite or group of satellites. Additionally, or alternatively, the data associated with satellites 125 can include data indicative of the past, present, and/or future trajectory of the satellite(s). Additionally, or alternatively, the data associated with the satellites can include information associated with the power resources (e.g., power level, etc.), memory resources (e.g., storage availability, etc.), communication resources (e.g., bandwidth), etc. of the satellite(s). Additionally, or alternatively, the data associated with the satellites 125 can include health and maintenance information associated with the satellite(s) 125 (e.g., maintenance schedules, damage reports, other status reports, etc.). Additionally, or alternatively, the data associated with the satellites 125 can include data indicative of the type and/or status of the hardware (e.g., antenna, communication interfaces, etc.) and/or software onboard a satellite.

The satellite command system 110 can be configured to determine whether at least one satellite is available to acquire image data in accordance with the request 140 based at least in part on the data associated with the satellites 125. For example, the satellite command system 110 can determine whether a satellite 125 (e.g., with sufficient power, memory, communication resources, etc.) is on a trajectory or can be moved to a trajectory/position that would allow the satellite 125 to acquire image data of a target (e.g., an area experiencing a wildfire) within a timeframe that meets the request 140 (e.g., within a timeframe associated with a high priority request). If so, the satellite command system can determine that a satellite from the plurality of satellites 125 is available to acquire the requested image data and can accept the request. Additionally, or alternatively, the satellite command system 110 can determine availability based on the currently scheduled imaging tasks of the satellites and whether such a task can be disturbed. In some implementations, the satellite command system 110 can provide a confirmation message to the user 135 (e.g., via the user interface 145).

The satellite command system 110 can be configured to select a satellite from the plurality of satellites (e.g., a plurality of imaging satellites) to acquire the image data based at least in part on the availability of the satellites 125 to acquire the image data. For example, in the event that only one satellite is available, the satellite command system 110 can select that available satellite to acquire the image data of the target. In some implementations, the satellite command system 110 can select a satellite from among a plurality of satellites that are available to acquire the image data. For example, the satellite command system 110 can perform an optimization analysis to determine which of the satellites 125 can be chosen to acquire the requested data in an expedited manner while minimizing the impact (e.g., time delay) on the other pending tasks and/or the satellite itself (e.g., power/memory resources).

The satellite command system 110 can be configured to generate an image acquisition command 155 for instructing an imaging satellite 125 to acquire image data. The image acquisition command 155 can include parameters for an imaging satellite 125 to utilize in order to acquire the requested image data. For example, the image acquisition command 155 can include data indicative of a location of the target, the order in which the associated data is to be acquired relative to other imaging tasks, a position/orientation of the imaging satellite 125, sensor settings (e.g., camera settings, etc.), and/or other information. In some implementations, as further described herein, an image acquisition command 155 can include a plurality of image acquisition tracks that indicate the sequences in which an imaging satellite 125 is to acquire image data.

In some embodiments, image acquisition commands 155 can comprise instructions to capture one or more images of one or more subjects of interest (SOIs). In some embodiments, an SOI can be an area of interest (AOI), such as, for example, a geographical area of which images are desired. For instance, an image acquisition command 155 can specify one or more coordinates for capturing images depicting a location and/or an area.

Additionally, or alternatively, image acquisition commands 155 can comprise instructions to determine one or more AOIs based on an indicated SOI. For instance, an SOI may have known or unknown whereabouts. An SOI can include any object; any structure; any entity; any land, air, or water-borne vehicle; any animal or groups of animals (e.g., present on land, air, and/or water); any weather formation or other natural, visually identifiable subject; or substantially any other subject of which images are desired. In some embodiments, the SOI can be specified in categorical terms and/or specific terms. For instance, an image acquisition command 155 can comprise instructions to obtain images of a specific SOI (e.g., a particular SOI having a specific identity, such as a particular ship in the ocean, particular weather formation being tracked, etc.). In some embodiments, an image acquisition command 155 can additionally or alternatively comprise instructions to obtain images of a category of SOIs, such that the instructions indicate for the imaging satellite(s) 125 to obtain image data of any subjects that match a particular profile and/or description. In this manner, an image acquisition command 155 can correspond to an SOI, and, in some embodiments, an AOI can be determined based on recognition of the SOI within an area.

The satellite command system 110 can be configured to transmit image acquisition commands to the selected imaging satellite via a plurality of communication pathways. The plurality of communication pathways can include a number of uplink communication pathways 200A-200C. For instance, the plurality of uplink communication pathways 200A-C can include a first uplink communication pathway 200A. The first uplink communication pathway 200A can include an uplink communication pathway via which an image acquisition command 155 is sent directly to the satellite 125. For instance, a signal can be sent from a ground-based command center to a satellite 125 when the orbital access and pointing/range requirements of that pathway are met (e.g., when the satellite is in an orbit position to receive a transmission from a ground-based command center). The first uplink communication pathway 200A may allow for larger sizes of data to be transmitted to a satellite 125. Due to the orbital access and pointing requirements, the first uplink communication pathway 200A may also have latency drawbacks for uplink (and/or downlink, when used for downlink in some embodiments). Thus, the first uplink communication pathway 200A may not always provide a ubiquitous, near-real time communication mechanism for transmitting data to and/or from the satellite(s) 125. The first uplink communication pathway 200A may also be referred to as the "standard uplink communication pathway 200A."

The plurality of uplink communication pathways 200A-C can include a second uplink communication pathway 200B. The second uplink communication pathway 200B can include an uplink communication pathway via which an image acquisition command is indirectly communicated to the satellite via a GEO hub 115 and/or a geostationary satellite 120. The GEO hub(s) 115 can be ground stations operated by the entities associated with the geostationary satellites 120. The geostationary satellites 120 can be satellites that travel at an orbit above the surface of the earth (or other body) and that generally provide line-of-sight coverage of a third of the Earth (or other body). For example, a single geostationary satellite 125 can be on a line of sight with about 40 percent of the earth's surface. Three such satellites, each separated by 120 degrees of longitude, can generally provide coverage of the entire Earth. This can allow the second uplink communication pathway 200B to provide a near-real time, persistent and ubiquitous communication solution for the satellite command system 110 to communicate with the satellites 125. The second uplink communication pathway 200B may also be referred to as the "RT communication pathway." Although communication pathways 200A-200B have heretofore been referred to as "uplink" communication pathways, it is to be understood that communication pathways 200A-200B can be used for uplink and/or downlink, such as shown in FIG. 1.

A third communication pathway which can be used for uplink and/or downlink is shown as downlink communication pathway 200C. The satellite command system 110 can transmit and/or receive communications (e.g., via first or third party ground-based stations) with the LEO relay(s) 123. The LEO relays 123, in turn, may communicate with the imaging satellite(s) 125 for the transmission and/or receipt of imaging task payloads (e.g., including image data, image acquisition commands, tip-and-cue instruction sets, etc.). In some embodiments, the uplink/downlink communication pathway 200C can include multiple transmissions between two or more imaging satellite(s) and one or more LEO relay(s) 123, for relaying imaging task payloads between imaging satellite(s) and/or to ground-based stations.

In some embodiments, the uplink/downlink communication pathway 200C can include communications directly with the user device 105. For instance, the user device 105 can include a terminal provided to the user 135 by an entity associated with the LEO relays 123, which can be the same entity as associated with the satellite command system 110 and/or the imaging satellite(s) 125 or can be a different entity than that associated with the satellite command system 110 and/or the imaging satellite(s) 125. Additionally, or alternatively, the user device 105 can be a device associated with an end-user, requestor, and/or consumer of the transmitted data.

By way of example, the destination of the imaging task payload can be a ground-based station. An imaging satellite 125 (e.g., selected by the satellite command system 110) may capture requested image data and store the image in an imaging task payload. The imaging task payload can include one or more frames of a video recording (e.g., captured via the imaging satellite 125). The imaging task payload may be transmitted to one or more LEO relays 123. In some embodiments, the LEO relay(s) 123 may transmit the imaging task payload to a ground-based station for servicing the request 140 (e.g., processing, storing, providing to an end-user, providing to another system/entity, etc.). The LEO relay(s) 123 may transmit the imaging task payload to one or more other relay satellites (e.g., one, two, three, or more other relay satellites; optionally also in low-earth orbit), and one of the other relay satellite(s) may transmit the imaging task payload to the ground-based station. In this manner, multiple relay satellites (e.g., two, three, or more) may be used to relay the imaging task payload to a destination for servicing the request 140. This may allow the one or more LEO relay(s) 123 to relay the imaging task payload to the ground-based station in a manner quicker than would be provided by waiting for the selected imaging satellite to arrive in the appropriate position in its orbit to directly downlink to the ground-based station. In some embodiments, the communication pathway 200C including one or more LEO relay(s) 123 can be selected based at least in part on a determination that a request is associated with a higher priority 150 (e.g., higher than a threshold), as similarly described herein.

In some examples, the imaging task payload may include information and/or instructions corresponding to additional image acquisition command(s), and the destination(s) of the imaging task payload may include one or more additional imaging satellites 125. For example, one or more additional imaging satellites 125 may include an imaging task payload receiver. For instance, a first imaging satellite 125 may be selected for acquiring the image data, and the first imaging satellite 125 may acquire and/or attempt to acquire image data. The first imaging satellite 125 can be instructed to transmit additional and/or further image acquisition command(s) to a second imaging satellite 125. The first imaging satellite 125 can transmit an imaging task payload containing the additional and/or further image acquisition command(s) (optionally also containing image data from the first imaging satellite) to one or more LEO relays 123 as described herein. The one or more LEO relays 123 may relay the imaging task payload to a second imaging satellite 125 for further acquisition of image data (e.g., of the same or different SOI). Optionally, if the first imaging satellite 125 successfully collected image data, the portion of the imaging task payload containing the successfully collected image data can be transmitted to a ground-based station or ground-based terminal in the manner described herein. In some embodiments, multiple imaging satellites 125 can acquire image data and successively forward the imaging task payload (e.g., optionally including the acquired image data) to maintain real-time or at least near real-time monitoring of a SOI, such as for real-time or at least near real-time monitoring of an AOI.

In one embodiment, at least near real-time monitoring can include the capture of one or more images in quick succession. For instance, in some embodiments, the images can be captured in quick succession in such a manner that the images can be combined and/or viewed as frames of a video. Advantageously, the low latency associated with example embodiments of communications pathways of the present disclosure can provide for the delivery of a plurality of one or more frames of a video in a near real-time fashion (e.g., "streaming" the captured successive images to a ground-based station). In some embodiments, a plurality of imaging satellites can cooperatively stream video imagery (e.g., successively captured images of a subject) by relaying the imaging task payload via one or more LEO relays 123, as described herein. For instance, a first imaging satellite 125 can continuously monitor an SOI (e.g., capture image data, such as for frames of a video depicting the SOI) while the SOI remains within view of the first imaging satellite 125, and the first imaging satellite 125 can then relay the imaging task payload to a second imaging satellite 125 for further acquisition of image data. Additionally, in some embodiments, the first and second imaging satellites 125 can continuously relay captured image data via the LEO relays 123 to a destination (e.g., ground-based terminal) while monitoring the SOI. For instance, the first and second imaging satellites 125 can include a steerable antenna array trained on at least one of the LEO relays 123 while monitoring the SOI.

The one or more LEO relays 123 of the communication pathway 200C can communicate with the imaging satellite(s) in a continuous manner, in a batch/burst manner, and/or in another manner. For example, in some embodiments, the imaging satellite(s) 125 can always be tracked via at least one of the LEO relays 123 (e.g., with a steerable antenna array) to constantly maintain for a period of time a communication pathway is in readiness for transmissions from the imaging satellite 125. In some embodiments, the imaging satellite 125 and at least one of the LEO relay(s) 123 can communicate on a schedule, such as based on times which correspond to scheduled and/or predicted relative positions/orientations of the respective satellites. In some embodiments, the LEO relay(s) 123, the imaging satellite(s) 125, and/or the ground-based station(s) can communication using radio frequency communications and/or optical transmissions (e.g., for downlink and/or uplink). For instance, one or more of the radio frequency communications and/or one or more of the optical transmissions can comprise signals of any suitable frequency. In some examples, one or more signals can be of a frequency of from about 5 GHz to about 20 GHz. In some examples, one or more signals can be of a frequency of about 20 GHz to about 40 GHz. In some examples, one or more signals can be of a frequency of about 26.5 GHz to about 40 GHz, such as a frequency of about 26.5 GHz to about 30 GHz.

Figure 2:
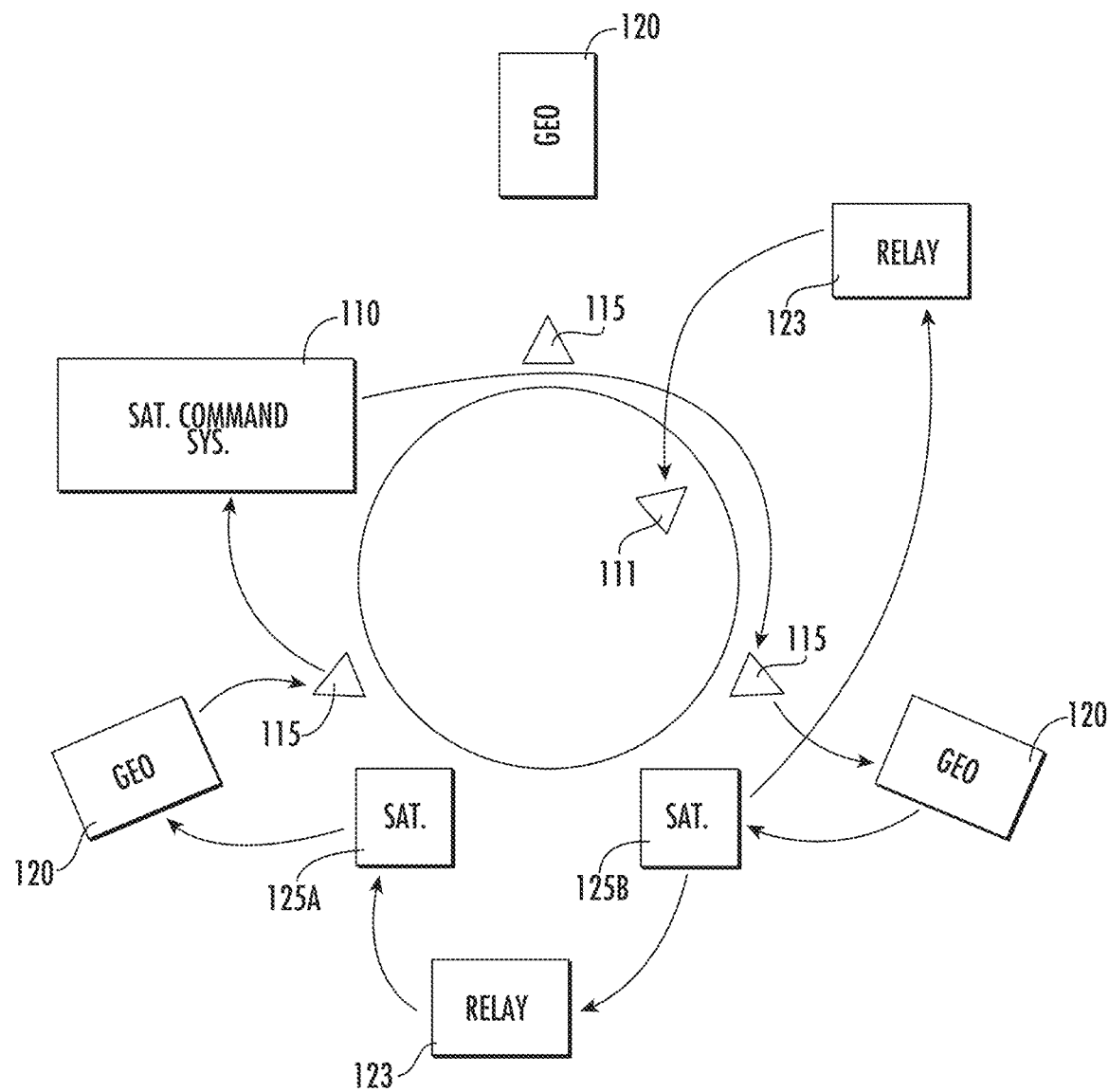
FIG. 2 depicts a graphical diagram illustrating an example communication pathway according to example embodiments of the present disclosure.

FIG. 2 provides a diagram overview of the RT communication pathway 200B and the uplink/downlink communication pathway 200C. For example, the RT communication pathway 200B can include a GEO communication infrastructure. One example GEO communication infrastructure that can be used to provide a near real-time communication solution is Very Small Aperture Terminal (VSAT). This can include a two way satellite communication system. For instance, the RT communication pathway 200B can include a plurality of geostationary satellites 120 with architecture for providing global beams such as, for example, bent-pipe C-band transponders providing global coverage beams. For example, as shown, three geostationary satellites 120 (e.g., with global C-band beams) placed 120 degrees apart can provide global coverage (e.g., at a 500 km low earth orbit altitude). The bent-pipe architecture can mirror the uplink channel to a lower frequency downlink channel (e.g., 6 GHZ to 4 GHZ). C-band transponders can be, for example, 36 MHz wide, while a maximum global covered latitude can be+81° for terrestrial stations and +90° for 500 km to 700 km low earth orbit. Such an approach can provide global low earth orbit coverage, a deterministic latency (e.g., ~10 s), lower cost, and a flexible bent-pipe architecture that allows for full control of modulation, coding, and encryption. The infrastructure of the RT communication pathway 200B (e.g., the GEO hub(s) 115, geostationary satellite(s) 120, etc.) can be associated with one or more other entities (e.g., third party vendors) that are different than the entity associated with the satellite command system 110 (e.g., the imaging service provider). In addition to C-band global beams, regional and spot beams are available at C, Ku, or Ka band that provide effective isotropic radiated power (EIRP) and gain over noise temperature (G/T). By leasing regional beams on multiple GEO satellites (more than 3) global coverage could be achieved at higher data rates.

To establish a network connection for the RT communication pathway 200B, the satellite command system 110 can utilize dedicated bandwidth from the geostationary satellites 120 and GEO hub(s) 115. A link can be established to a particular satellite 125B, for example (e.g., a LEO satellite, MEO satellite, etc.), by selecting the corresponding geostationary satellite 120 and GEO hub 115. As described herein, the GEO hub(s) 115 can be ground stations with communication infrastructure for communication with the geostationary satellites 120. In some implementations, modems tuned to dedicated frequencies for the entity associated with the satellite command system 110 can be housed at the GEO hub(s) 115. The RT communication pathway 200B can achieve, for example, a round trip time of 0.5 seconds up to several seconds to transmit an image acquisition command 155 to a satellite 125B.

The RT communication pathway 200B may not require special pointing constraints for enforcing tasking operations (e.g., transmitting image acquisition commands). To allow for on-demand, persistent, near real-time tasking, a receiver on the satellite 125B may be kept on. In some implementations, tasking reaction time can be on the order of minutes depending on the image acquisition command length (e.g., a deterministic quantity). Tasking can be done in an open loop fashion. Tasking data rates can be, for example, on the order of 10s of bits per second (bps) without pointing and could go up to 500 bps with pointing (if desired).

The satellite 125A, 125B may optionally not communicate (e.g., to the satellite command system 110) an acknowledge message of the receipt of the image acquisition command 155. This can help to avoid the consistent powering and positioning (e.g., toward a geostationary satellite 120) of a satellite transmitter. In some implementations, to establish a reverse link for an acknowledgement (if desired), a satellite 125A can turn the transmitter on and point it towards a geostationary satellite(s) 120 to follow the same/similar pathway to the satellite command system 110 as the image acquisition command 155.

Image acquisition commands 155 sent from the satellite command system 110 can be transmitted via the network(s) 130 (e.g., an internet network, etc.) to a GEO hub 115. The GEO hub 115 can transform an image acquisition command 155 to a radio signal. The GEO hub 115 can provide frequency translation, amplification, and retransmission to the geostationary satellite 120.

The RT communication pathway 200B can allow the system 100 to overcome certain communication-related issues. For example, to mitigate potential Doppler problems, the system 100 can utilize a bandwidth expansion technique such as, for example, direct sequence spread spectrum (DSSS) scheme. Bandwidth expansion can case carrier synchronization and tracking, case reference frequency oscillator tolerances, allow the increase of total transmitted power without violating maximum power spectral densities (PSD), etc. Moreover, DSSS technique can allow for the use of the same shared spectrum to communicate with a fleet of satellites 125A, 125B (e.g., LEO satellites). In another example, uplink transmissions (e.g., at 6 GHZ) can be subject to an angular emission mask to avoid interference to adjacent geostationary satellites. In some implementations, assets in the RT communication pathway 200B can use a small aperture low gain antenna that could illuminate multiple geostationary satellites. To mitigate this problem, one example solution can be to operate with a low power transmitter (1 W) occupying a particular bandwidth (e.g., 1 MHz bandwidth).

As shown, in the RT communication pathway 200B, the satellite command system 110 can communicate an image acquisition command 155 to a GEO hub 115. As further described herein, the GEO hub 115 can communicate the image acquisition command 155 (e.g., a radio signal translation thereof) to a geostationary satellite 120. The geostationary satellite 120 can communicate the image acquisition command 155 to the selected satellite 125A, 125B that is to acquire the requested image data. In some implementations, a GEO hub 115 can communicate the image acquisition command 155 to one or more other GEO hubs 115. This can allow the GEO hub(s) 115 to communicate the image acquisition command 155 to the geostationary satellite 120 that can most effectively transmit the image acquisition command 155 to the selected satellite 125A, 125B. For example, a geostationary satellite 120 that is associated with a selected satellite 125A, 125B (e.g., with the selected satellite in the coverage area, within LOS of the selected satellite 125A, 125B, etc.) may be the most effective intermediary for communicating with that selected satellite 125A, 125B.

As also shown in FIG. 2, relay satellite(s) 123 can be used to relay communications between one or more imaging satellites 125 (e.g., imaging satellites 125A and 125B) and also between the imaging satellite(s) 125A, 125B and a ground-based station 111. For instance, the imaging satellite(s) 125A, 125B may be out of range of or otherwise inaccessible by the ground-based station 111, but by relaying an imaging task payload via the relay(s) 123, the payload can be delivered to the ground-based station 111 with low latency. In another example, the imaging satellite 125B may be commanded to acquire image data of a particular AOI and/or SOI (e.g., with an image acquisition command sent via the RT communications pathway 200B). The imaging satellite 125B may succeed, or it may fail to obtain satisfactory results. Depending on the command, the imaging satellite 125B may, in some embodiments, forward the image acquisition command to imaging satellite 125A via the LEO relay 123 for further image capture of the AOI and/or SOI (e.g., to obtain at least one successful image capture and/or additional successful image captures).

Figure 3:
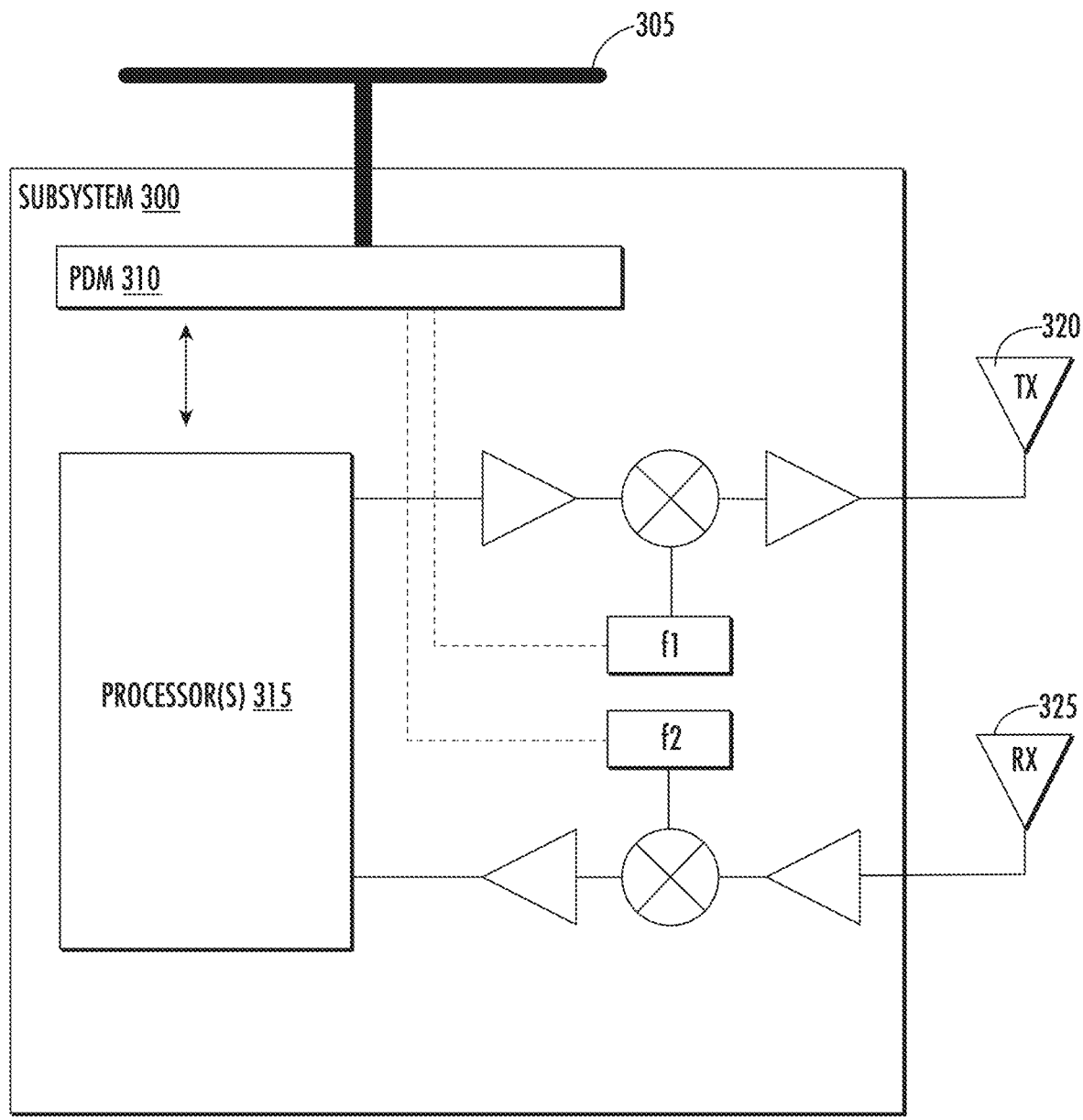
FIG. 3 depicts a block diagram of satellite hardware according to example embodiments of the present disclosure.

The satellite(s) 125A, 125B can be configured to obtain the image acquisition command 155 (e.g., a radio signal translation thereof, etc.) and acquire the requested image data. The satellite(s) 125A, 125B can include hardware that allows the satellite(s) 125A, 125B to obtain data via the RT communication pathway 200B and/or communicate data via the RT communication pathway 200B. For example, with reference to FIG. 3, a satellite 125 can include a subsystem 300 that is designed to interface directly with a satellite power/data bus 305 (e.g., with minimal hardware and software impact). The subsystem can use the same power and data module (PDM) circuit 310 used by other subsystem(s) of the satellite(s) 125. This can include, for example, utilizing a bus voltage (e.g., nominal 28V, range of 22-32 V, etc.) and/or data interface (Dual CAN bus, 1 Mbit/s, etc.). The subsystem 300 can include a baseband processor (e.g., a microcontroller, CPLD, FPGA, etc.) that is configured to manage antenna functions (e.g., all the radio functions that require an antenna, etc.).

The subsystem 300 can provide RF interfaces for the transmit (Tx) external antenna 320 and/or receive (Rx) external antenna 325. A satellite 125 can utilize full-duplex operation, such that the receiver is enabled at all times. The satellite 125 can utilize frequency separation f1, f2, etc. (e.g., 6 GHZ/4 GHz Tx/Rx frequency separation) for effective isolation between the receiving (Rx) and transmitting (Tx) paths.

The expected power consumption of the subsystem 300 can be, for example: PDM subsystem: 1 W, 100% duty; Baseband processor: 1 W, 100% duty; Rx chain: 1 W, 100%; and Tx chain: 5 W, 1% duty. A link for the RT communication pathway 200B can be routed through an EPB of a satellite 125. This can be implemented by either piggy backing onto an existing EPB-PDM link and creating a spliced connection and/or modifying the EPB.

A satellite 125 can include antenna(s) that allow the satellite 125 to utilize the RT communication pathway 200B and/or the uplink/downlink communication pathway 200A. For instance, a satellite 125 can include an omnidirectional antenna that can be configured to close the link for tasking. One or more antennas may be electronically steerable. Additionally, or alternatively, a satellite 125 can include a phased array antenna (e.g., for higher data rates). Two separate antennas can be included for the forward and/or reverse link. One or more circular polarization antennas may be used (e.g., left hand and right hand antennas).

An antenna can be mounted in the z-axis in the zenith pointing (anti-nadir) direction. The mounted antenna can have sufficient gain under all pointing modes to at least one geostationary satellite 120.

In some implementations, an antenna for use with the RT communication pathway 200B, uplink/downlink communication pathway 200C, etc. can include a quadrifilar helix antenna. A quadrifilar helix antenna has a broad radiation pattern and can provide 0 dBi gain to +−70 degrees. It has very good axial ratio across the entire beam. In some implementations, more than one receive antenna can be included in a satellite 125 to help ensure that there are no gaps in coverage even at the extreme off-axis angles (e.g., a multi-input multi-output (MIMO) antenna architecture). A patch antenna or a patch array can be another option (e.g., for a directional beam).

Figure 4:
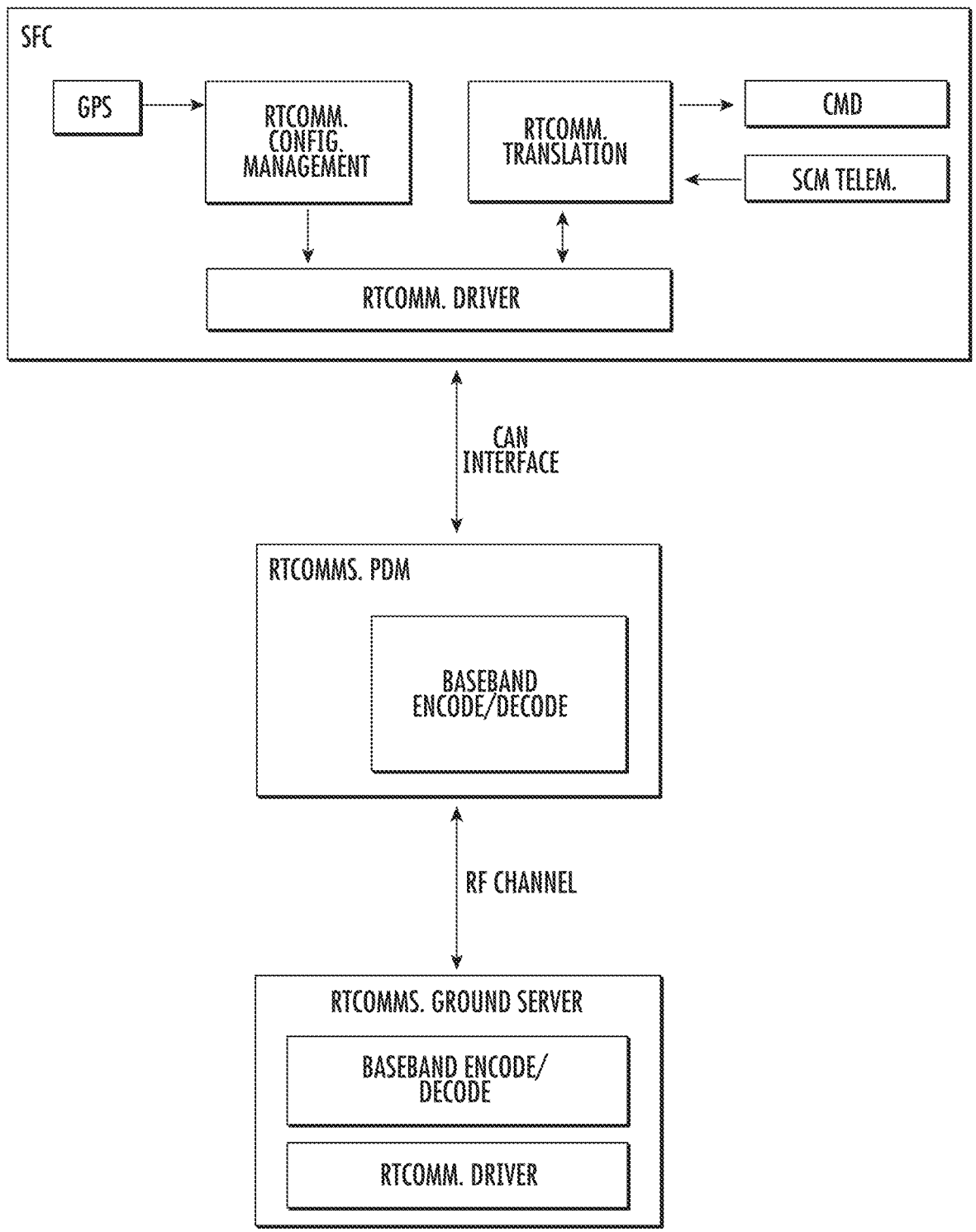
FIG. 4 depicts a block diagram of example satellite software according to example embodiments of the present disclosure.

FIG. 4 depicts a block diagram 400 of the onboard satellite software modules that may be utilized in the satellite flight software to support the RT communication pathway 200B. To utilize the RT communication pathway 200B, the satellite flight software can include an execution model (e.g., pthread, etc.) to support certain requirements for the RT communication pathway 200B, software to support the hardware a translation layer (e.g., providing a highly efficient packet protocol), a commanding interface to utilize the low bandwidth channel (e.g., 10s bits/second), an interface to sequence loading, module(s) for attitude control system (ACS) Target tracking, a module for image (IMG) captures, module(s) for emergency commanding, module(s) for real time telemetry feedback for critical satellite states module(s) for providing the ability to change pathway settings autonomously based on position (e.g., GPS, etc.) and specific geostationary satellite footprint that has the best line-of-sight (LOS) for the satellite 125, ground packages to encode/decode data transmitted via the RT communication pathway 200B, potentially a module for supporting higher bandwidth in the RT communication pathway 200B (e.g., utilizing pointing requirements), and/or other modules.

Since the bandwidth going through the RT communication pathway 200B can be low, the system 100 can utilize an optimized solution in terms of the amount of bytes required to change an imaging activity. This can be achieved, for example, in the following ways: by providing a highly optimized interface to change a sequence with ACS and IMG commands on the satellite, by providing a highly optimized packet protocol with low overhead going over the RT communication pathway 200B, by creating the smallest common denominator when it comes to changing an imaging activity, and/or other approaches. In some implementations, sequences are utilized for image events. The satellite 125 can treat the loading and activating of a specific sequence id as mutually exclusive in order to prevent race condition when executing a sequence. This means that a sequence can be the lowest common denominator. Additionally, or alternatively, only a part of a schedule that is affected by a high priority request can be updated. This can include allowing the satellite software to keep loading and activating a specific sequence identifier as mutually exclusive with ground scheduler requirements to allow multiple imaging activities in one or more sequences.

The RT communication pathway 200B and/or the uplink/downlink communication pathway 200C can be associated with various security-related features. For example, the satellite command system 110, the GEO hub(s) 115, the geostationary satellite(s) 120, the relay satellite(s) 123, and/or the satellite(s) 125 can utilize encryption and authentication of commands and telemetry, command level (operational, privileged) enforcement, replay protection, periodic key rotation, and/or other security mechanisms.

Figure 5:
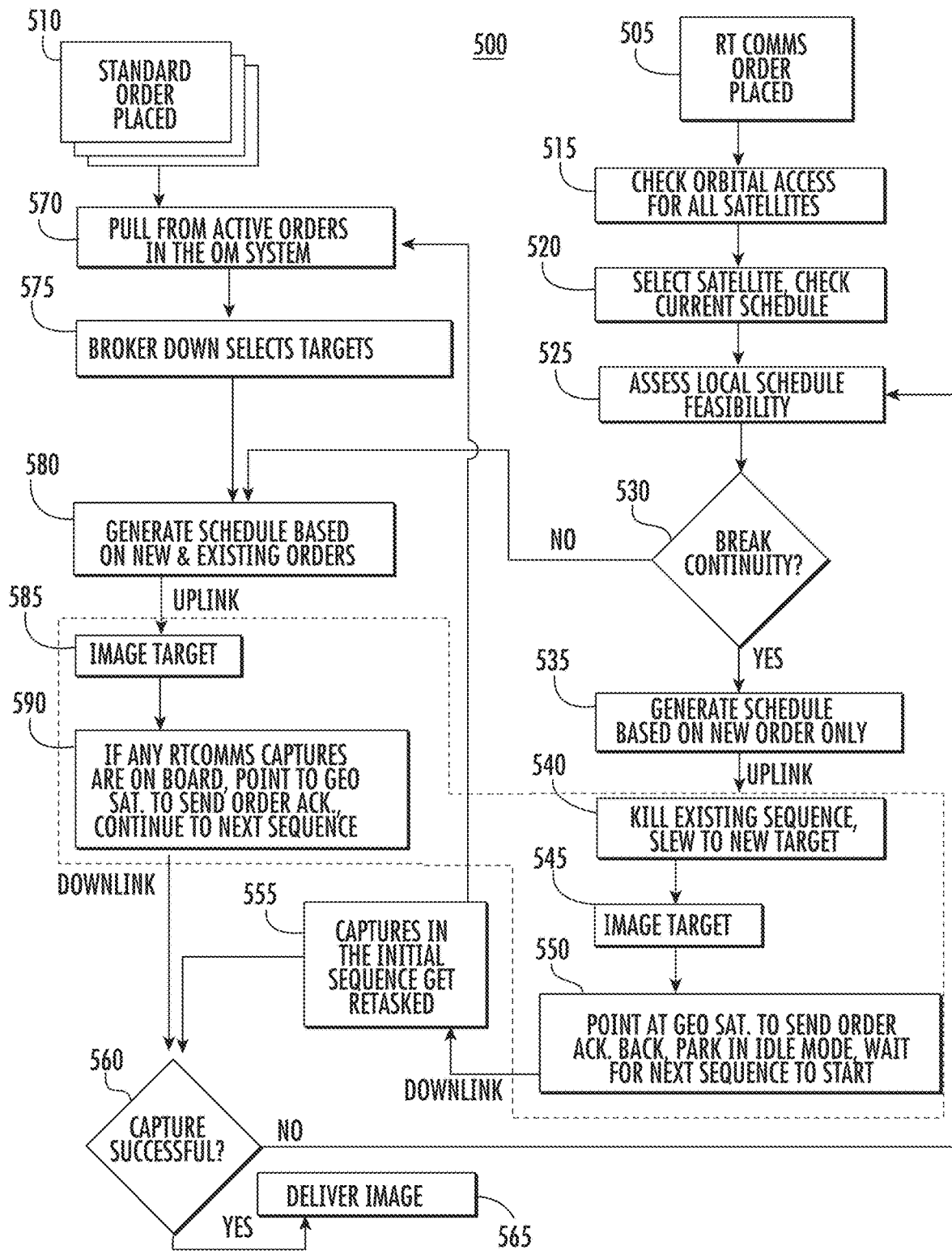
FIG. 5 depicts a flow diagram of an example method for selectively communicating with and controlling satellites to acquire image data according to example embodiments of the present disclosure.

FIG. 5 depicts a flow diagram of an example method 500 for selectively communicating with and controlling satellites to acquire image data according to example embodiments of the present disclosure. One or more portion(s) of the method 500 can be implemented by a computing system that includes one or more computing devices such as, for example, the computing systems described with reference to the other figures (e.g., a satellite command system 110, a GEO hub 115, a geostationary satellite 120, a relay satellite 123, a satellite 125, etc.). Each respective portion of the method 500 can be performed by any (or any combination) of one or more computing devices. Moreover, one or more portion(s) of the method 500 can be implemented as an algorithm on the hardware components of the device(s) described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method 500 can be performed additionally, or alternatively, by other systems.

At (505) and (510), the satellite command system 110 can obtain a request for image data. At (505), the request can be associated with a high priority, which would lend itself to communication via the RT communication pathway 200B. To properly handle a request that is employing the RT communication pathway, such a request can be able to jump the queue or will have a different order management (OM) pathway. As described herein, a user 135 can select a high priority (RT communication pathway 200B) for the requested image data via a user interface 145 (e.g., presenting a browser, etc.). Such a selection would initiate a fast feasibility evaluation by the satellite command system 110 (e.g., an order management (OM) system 160, a scheduler system 165, a validation system 170 as shown in FIG. 1), at (515) to (530). The satellite command system 100 can check orbital access for the plurality of satellites 125 (at 515), select an available satellite and check its current schedules (at 520), determine the feasibility of adjusting the current schedule for the request and determining whether continuity of the current schedule is appropriate (at 530). The satellite command system 110 can inform the customer if access is available in a high priority timeframe (e.g., the next TBD minutes). If there is no access within that time, the OM system 160 can recommend an intermediate priority request (e.g., a request that is given priority within the standard communication pathway 200A). In addition to feasibility, an updated priority tiering model can be employed to make sure that if any other users get "bumped" from their previously scheduled image acquisition, it is of a sufficiently lower priority. The access and priority criteria being met, the user 135 can confirm that the user 135 wants to make the request.

In some implementations, the satellite command system 110 can communicate and/or stored data indicative of a schedule change. Such data can be utilized for a variety of purposes. For example, the data indicative of the schedule change can be utilized for user notification and expectation management (e.g., with respect to capture/deliver timelines) as well to keep track to support the scheduler in retasking bumped requests. Additionally, or alternatively, operations/functions may utilize the data indicative of the schedule changes for satellite troubleshooting and/or situational awareness. Additionally, or alternatively, a data pipeline can utilize such data to remain informed of what image data collections to expect, keeping the platform in sync.

At (535), the satellite command system 110 (e.g., the schedule system 165) can generate image acquisition commands 155 for a satellite 125. For example, the satellite command system 110 can package the sequences in the appropriate order to signal to the satellite 125 that it is overwriting a nominal imaging sequence. The image acquisition command 155 can be communicated via the RT communication pathway 200B. For example, the determined sequence can be communicated to a GEO hub 115, which in turn can communicate it to an associated geostationary satellite 120.

As described herein, in some implementations, the satellite 125 may not communicate an acknowledgement of the image acquisition command 155. Accordingly, it is possible that the command could fail en route, so there may be a period of time where the satellite state is unknown. As a result, the satellite command system 110 can retain information on both the collection with the request sent via the RT communication pathway 200B and the previously-scheduled collection. These two states can be held until a confirmation or failure is received from the satellite 125. This could happen, for example, within a few minutes after command transmission (e.g., if the command is successfully sent via the RT communication pathway 200B) and/or the next time the satellite 125 has a ground contact (if the RT command failed). At (540)-(550), the satellite 125 can acquire image data as instructed via the RT communication pathway 200B. For example, the satellite 125 can obtain the newly generated schedule/sequence, kill/overwrite any existing sequences and adjust for the new target (at 540), and acquire the image data of the target (e.g., via an onboard camera, imaging system, etc.), at (545). The satellite 125 can point at a geostationary satellite 120 to communicate an acknowledgement (via the RT communication pathway 200B) that the image date was acquired, at (550). In this way, the user 135 can be notified of an imaging events success or failure (e.g., success known by acknowledgement sent via the RT communication pathway 200B, failure known by message sent via the RT communication pathway 200B or a lack of an acknowledgment following the imaging event, etc.). In some implementations, the satellite 125 can switch to an idle mode and wait for the next sequence to start. For bumped requests, the satellite command system 110 (e.g., the scheduler system 165, the OM system 160, etc.) can work to re-task the request and inform the bumped user of the change, and the satellite 125 can work to acquire the image data associated with the bumped requests, at (555).

In the event that the image data acquisition is successful (at 560), the image data acquired by the satellite 125 can be downlinked (e.g., via the standard communication pathway 200A, at the next ground site, via one or more relay satellites 123 along a downlink communication pathway 200C, etc.), at (565). A downlink tier can be leveraged to make sure that high priority image data (e.g., for which a command was sent via the RT communication pathway 200B) is the first image data downlinked from the satellite 125. The user 135 can be notified as soon as the image data arrives at the satellite command system 110 and/or an another system. In some implementations, a user 135 can access raw frames to speed up the user's access to the image data and drive their decisions in real time. Processed image data, when complete, can also be made available to the user 135. In the event that the image data acquisition is not successful (at 560), the satellite command system 110 can return to its feasibility analysis in an attempt to re-start the process.

In the event that the request is not suited for transmission via the RT communication pathway 200B (e.g., due to a lower priority, lack of feasibility, etc.), the request can follow the flow provided at (570) to (590). For example, the satellite command system 110 can pull from the pending requests (at 570), down select targets (at 575), and generate a new schedule based at least in part on the request (at 580). An image acquisition command 155 (e.g., including data indicative of the schedule) can be uplinked to the satellite 125 via the standard communication pathway 200A. At (585), the satellite 125 can process the image acquisition command 155 and acquire the image data of the target (e.g., in accordance with the schedule). At (590), if any high priority image data is onboard, the satellite 125 can send an acknowledgement via the RT communication pathway 200B and downlink such image data first. The satellite 125 can then downlink any lower priority image data (e.g., via the standard communications pathway 200A, via one or more relay satellites 123 along a downlink communication pathway 200C, etc.), for the successful image acquisitions.

Figure 6:
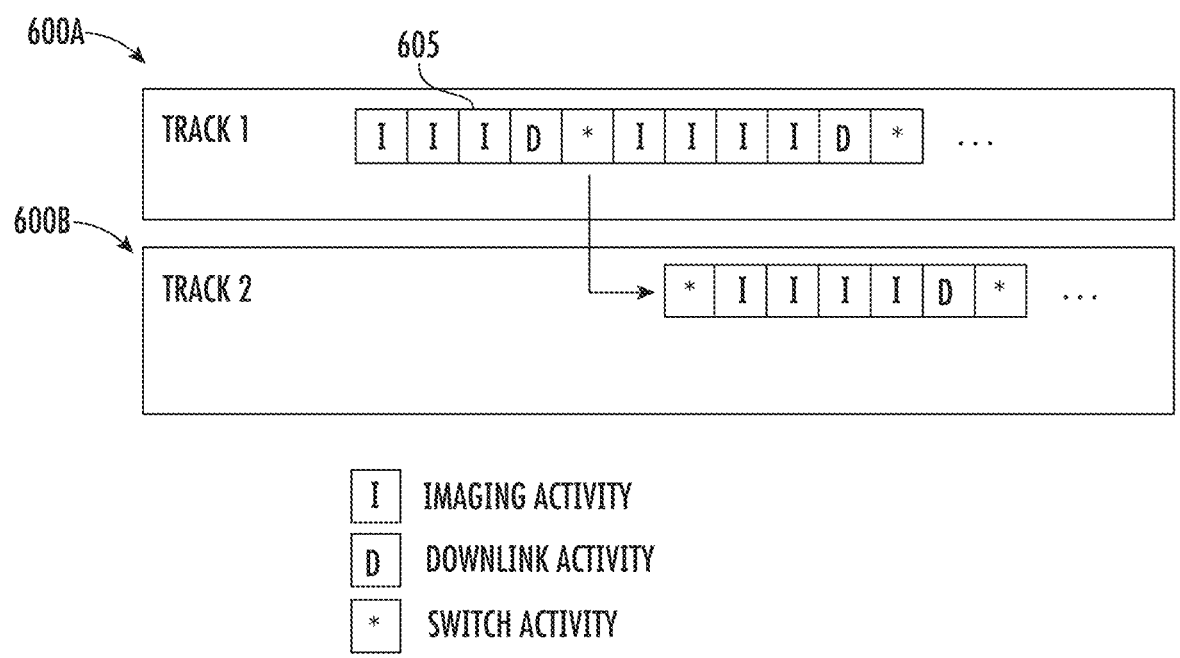
FIG. 6 depicts example image acquisition tracks according to example embodiments of the present disclosure.

With reference to FIG. 6, in some implementations, the satellite command system 110 can generate a plurality of image acquisition tracks 600A-B for a satellite 125. The plurality of tracks can include a first image acquisition track 600A and a second image acquisition track 600B. An image acquisition track 600A-B can include one or more sequences 605 (e.g., image acquisition commands). A sequence 605 can include an identifier, sequence lines (e.g., a line of command, a timestamp, args, etc.), a cyclic redundancy check (CRC), and/or other information. A sequence 705 can be indicative of an imaging activity, a downlink activity, or a switch activity. Each sequence 705 can activate the next sequence in the track that is meant to be run. In some implementations, a satellite 125 can go into a "safe mode" when it is not running a sequence.

The sequences 605 of the image acquisition track 600A-B can be uplinked to the satellite 125. For example, the image acquisition tracks 600A-B can be communicated to the satellite 125 via the standard communication pathway 600A (and/or the RT communication pathway 200B). The sequences 605 can be activated by the satellite 125 to begin performing the activities identified in that associated image acquisition track 600A-B.

The first image acquisition track 600A can be different than the second image acquisition track 600B. For example, the first image acquisition track 600A can include sequence number ranges 10001-20000 and the second image acquisition track 600B can be 20001-30000. Only one image acquisition track can be active at a given time. The satellite 125 can switch between the first and second image acquisition tracks 600A-B. For instance, an image acquisition track (e.g., the first image acquisition track 600A) can include a sequence that indicates a switch activity (shown as a "*" in FIG. 6). Upon activation of that sequence, the satellite 125 can switch to begin executing the sequences in another image acquisition track (e.g., the second image acquisition track 600B). This provides the ability to store a schedule onboard, and load an alternative schedule to the inactive track, and switch at the most opportune moment.

The following is an end-to-end example implementing a plurality of image acquisition tracks 600A-B for a satellite 125. A user 135 can submit a request 140 for the acquisition of image data. The priority 150 associated with the request 140 can be a high priority. The satellite command system 110 can generate an image acquisition track based at least in part on the request 140. For example, the satellite command system 110 (e.g., a track scheduling system 175 shown in FIG. 1) can analyze the existing schedule from a currently active track, make a copy of it, and insert the newly desired imaging activity based on the priority of this request and the other pending requests. In some implementations, a scheduling solution can include replacing all imaging between two switch activities with the imaging of the targets tasked using the RT communication pathway 600B. In some implementations, a scheduling solution can include having the satellite 125 acquire image data as well as possible (taking into account priorities etc.) between two switch activities, while including the tasked target. In some implementations, a scheduling solution can include having the satellite 125 acquire image data as well as possible while ensuring that the RT target is tasked while minimizing the impact on existing tasks so that current schedules are not impacted. Once the image acquisition track is generated, it can be checked by the validation system 170 (e.g., so as not to violate any constraints). The image acquisition track can be sent to satellite 125 (e.g., via the standard communications pathway 600A and/or the RT communication pathway 600B).

In some implementations, the satellite command system 110 can predict that a request may become a high priority request at a later time and generate a plurality of image acquisition tracks accordingly. For instance, a user 135 can submit a request 140 that does not indicate a priority 150 and/or indicates an intermediate or standard priority. The satellite command system 110 can be configured to determine that the priority 150 associated with the request 150 may potentially change to a high priority request. Such a determination can be made, for example, based on the user 135, the target, the target's locations, etc.

The satellite command system 110 can generate a plurality of image acquisition tracks to handle the potentially high priority request. For example, the satellite command system 110 can generate a first image acquisition track 600A that includes an image acquisition sequence associated with acquiring the requested image data. The first image acquisition track 600A can place an associated imaging activity sequence for the request in a manner for an intermediate or standard priority. The satellite command system 110 can generate a second image acquisition track 600B that includes an image acquisition sequence associated with acquiring the requested image data. The image acquisition sequence of the second image acquisition track 600B can be afforded a higher priority than in the first image acquisition track 600A. For example, the image acquisition sequence can be positioned in the second image acquisition in a position of higher priority ahead of other pending requests than is done in the first image acquisition track 600A. This can be a placement that is in accordance with a request that would be addressed via the RT communication pathway 200B and/or the communication pathway 200C. The satellite command system 110 can communicate data indicative of the first image acquisition track 600A and the second image acquisition track 600B to the satellite via the standard communication pathway 200A. The satellite 125 can active the first image acquisition track 600A.

In the event that the priority of the request changes (e.g., to a high priority), the satellite command system 110 can generate an image acquisition command 155 to cause the satellite 125 to switch from the first image acquisition track 600A to the second image acquisition track 600B. Such a command can be communicated to the satellite 125 via the RT communication pathway 200B. The satellite 125 can obtain the image acquisition command 155 indicative of the switching activity. The satellite 125 can switch from the first image acquisition track 600A to the second image acquisition track 600B based at least in part on the image acquisition command 155 indicative of the switching activity. This can allow the satellite 125 to implement the image acquisition sequence associated with the acquisition of the requested data sooner than under the first image acquisition sequence 600A. The image data can be downlinked (e.g., via the standard communication pathway 200A, via one or more relay satellites 123 along a downlink communication pathway 200C, etc.) after image acquisition and the image data can be made available to the user 135 (e.g., for download, preview, viewing, etc.).

The track-scheduling system 175 (shown in FIG. 1) can utilize at least a portion of the codebase of the scheduler system 165. The track-scheduling system 175 can be configured to run with a smaller scope (e.g., of one satellite, etc.), one or more targets, and for a shorter duration (less than the orbital period). The scheduling system 165 and the track-scheduling system 175 can generate different image acquisition tracks. For example, the schedule system 165 (e.g., the more robust scheduler) can generate the first image acquisition track 600A and the track-scheduling system 175 (e.g., the leaner scheduler) can generate the second image acquisition track 600B.

Figure 7:
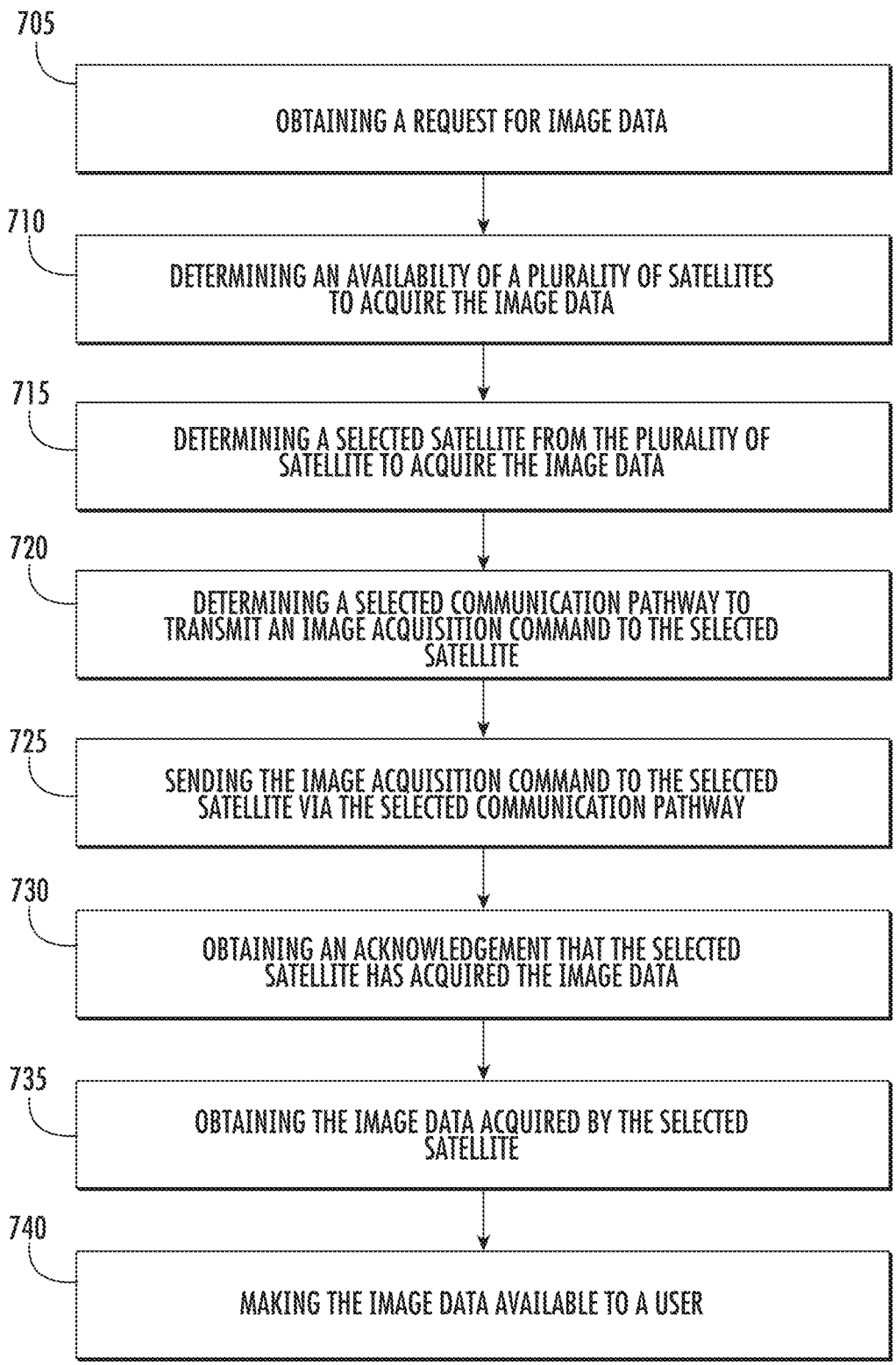
FIG. 7 depicts a flow diagram of an example method for satellite imaging control according to example embodiments of the present disclosure.

FIG. 7 depicts a flow diagram of an example method 700 for satellite imaging control according to example embodiments of the present disclosure. One or more portion(s) of the method 700 can be implemented by a computing system that includes one or more computing devices such as, for example, the computing systems described with reference to the other figures (e.g., a satellite command system 110, etc.). Each respective portion of the method 700 can be performed by any (or any combination) of one or more computing devices. Moreover, one or more portion(s) of the method 800 can be implemented as an algorithm on the hardware components of the device(s) described herein, for example, to control satellites to acquire and downlink image data. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One or more portions of method 700 can be performed additionally, or alternatively, by other systems.

At (705), the method 700 can include obtaining a request for image data. For instance, the satellite command system 110 can obtain a request 140 for image data. As described herein, the request 140 can be submitted via a user device 105 that presents a user interface 145 for creating the request 140. The request 140 can be associated with a priority 150 for acquiring the image data. The priority can be specified by a user 130 and/or determined by the satellite command system 110, as described herein. The priority 150 can include, for example, a standard priority, an intermediate priority (e.g., a request to be scheduled ahead of standard requests), or a high priority (e.g., a request to be given a super priority that can initiate the utilization of a dedicated communication pathway).

At (710), the method 700 can include determining an availability of a plurality of satellites to acquire the image data. For instance, the satellite command system 110 can determine an availability of a plurality of satellites 125 to acquire the image data based at least in part on the request 140. By way of example, the satellite command system 110 can obtain and analyze data associated with the satellites 125 to determine if any would be available to acquire image data of the requested target within a timeframe that is sufficient for the request 140. As described herein, this can be based at least in part on the state of a satellite 125 (e.g., its available power resources, memory resources, current schedule, etc.), a trajectory of a satellite 125, and/or the other pending requests (e.g., can they be bumped and to what degree for this request).

At (715), the method 700 can include determining a selected satellite from the plurality of satellites to acquire the image data. For instance, the satellite command system 110 can determine a selected satellite from the plurality of satellites 125 to acquire the image data based at least in part on the availability of the selected satellite to acquire the image data. By way of example, the satellite command system 110 can run an optimization algorithm to determine which satellite can acquire the requested image data with the lowest impact on the current pending requests and/or the satellite itself/fleet.

At (720), the method 700 can include determining a selected communication pathway to transmit an image acquisition command to the selected satellite. For instance, the satellite command system 110 can determine a selected communication pathway of a plurality of communication pathways 200A-C to transmit an image acquisition command 155 to the selected satellite based at least in part on the priority 150 for acquiring the image data. As described herein, the plurality of communication pathways can include a first uplink communication pathway 200A via which the image acquisition command 155 is sent directly to the selected satellite (e.g., the standard communication pathway). The plurality of communication pathways can include a second uplink communication pathway 200B via which the image acquisition command 155 is indirectly communicated to the selected satellite via a geostationary satellite (e.g., the RT communication pathway).

By way of example, the priority 150 for acquiring the image data can be indicative of a high priority. In response, the satellite command system 110 can determine that the selected communication pathway includes the second uplink communication pathway via which the image acquisition command is indirectly communicated to the selected satellite via a geostationary satellite 120. As described herein, this RT communication pathway can provide a near real-time persistent communication pathway that can allow for expediting the acquisition of the image data. In another example, the priority 150 for acquiring the image data is not indicative of a high priority. In response, the satellite command system 110 can determine that the selected communication pathway includes the first uplink communication pathway via which the image acquisition command is sent directly to the selected satellite 125. As described herein, this standard communication pathway may include some delays due to pointing requirements for data transmission and, thus, may be appropriate for lower priority requests.

At (725), the method 700 can include sending the image acquisition command to the selected satellite via the selected communication pathway. For instance, the satellite command system 110 can send the image acquisition command 155 to the selected satellite via the selected communication pathway (e.g., including the second uplink communication pathway). In some implementations, the satellite command system 110 may not receive an acknowledgement of the receipt of the image acquisition command 115 by the selected satellite via the selected communication pathway (e.g., the second communication pathway).

At (730), the method 700 can include obtaining an acknowledgement that the selected satellite has acquired the image data. The selected satellite 125 can be configured to acquire the image data based at least in part on the image acquisition command 155. For example, the selected satellite can be configured to obtain the image acquisition command 115, and to adjust the selected satellite and acquire the image data based at least in part on the image acquisition command 155. This can include adjusting the position, orientation, etc. of the selected satellite 125 to acquire the image data.

In some implementations, the satellite can be configured to adjust an onboard imaging schedule based at least in part on the image acquisition command. For instance, the satellite command system 110 can determine that that the priority for acquiring the image data is a potentially high priority (e.g., indicating that a request may become a high priority at a later time). Such a determination can be based at least in part on the user 135, the target, etc. The satellite command system 110 can generate a first image acquisition track 700A that includes an image acquisition sequence associated with acquiring the image data. The satellite command system 110 can generate a second image acquisition track 700B (that is different than the first image acquisition track 600A). The second image acquisition track 700B can include an image acquisition sequence associated with acquiring the image data. The image acquisition sequence can be afforded a higher priority in the second image acquisition track 700B than in the first image acquisition track 600A, as described herein. The satellite command system 110 can communicate data indicative of the first image acquisition track 600A and the second image acquisition track 600B to the selected satellite 125.

The satellite command system 110 can determine that the priority 150 associated with acquiring the image data is a high priority (e.g., at a later time). The satellite command system 110 can communicate an image acquisition command to the satellite 125 based at least in part on the determination that the priority 150 is a high priority. The image acquisition command can be indicative of a command for the selected satellite to switch from the first image acquisition track 600A to the second image acquisition track 600B. The selected satellite can be configured to switch to from the first image acquisition track 600A to the second image acquisition track 600B and acquire the image data in accordance with the second image acquisition track 600B (e.g., so that the requested image data is acquired sooner).

At (735), the method 700 can include obtaining the image data acquired by the selected satellite. For instance, the satellite 125 can be configured to downlink the acquired image data to the satellite command system 110. The image data can be communicated via the first communication pathway (e.g., the standard communication pathway) and/or the RT communication pathway. The satellite command system 110 can obtain the image data acquired by the selected satellite 125 via the first communication pathway. Additionally, or alternatively, the acquired data can be downlinked using one or more relay satellites 123 as described herein.

At (740), the method can include making the image data available to a user. For instance, the satellite command system 110 can make the image data available to a user 135. This can include, for example, communication the image data (e.g., a raw version, a processed version, etc.) to a user device 105, provide the image data for display via a user interface for viewing by the user, providing access to the image data for download, preview, etc.

While FIG. 7 describes the communication of image acquisition commands via a selected communication pathway, the present disclosure is not limited to such an embodiment. The command(s) communicated via the selected communication pathway can include other data and/or information. For instance, the command(s) can also, or alternatively, include data and/or information related to launch and early orbit operations (commissioning) commands, anomaly recovery operations, down linking high importance information (e.g., image tiles, critical system status (heath information), GPS radio sample data, etc.), radio ranging (e.g., as the path is deterministic/the relays are fixed and can be used to calculate ranging just as ground originated signals).

Figure 8:
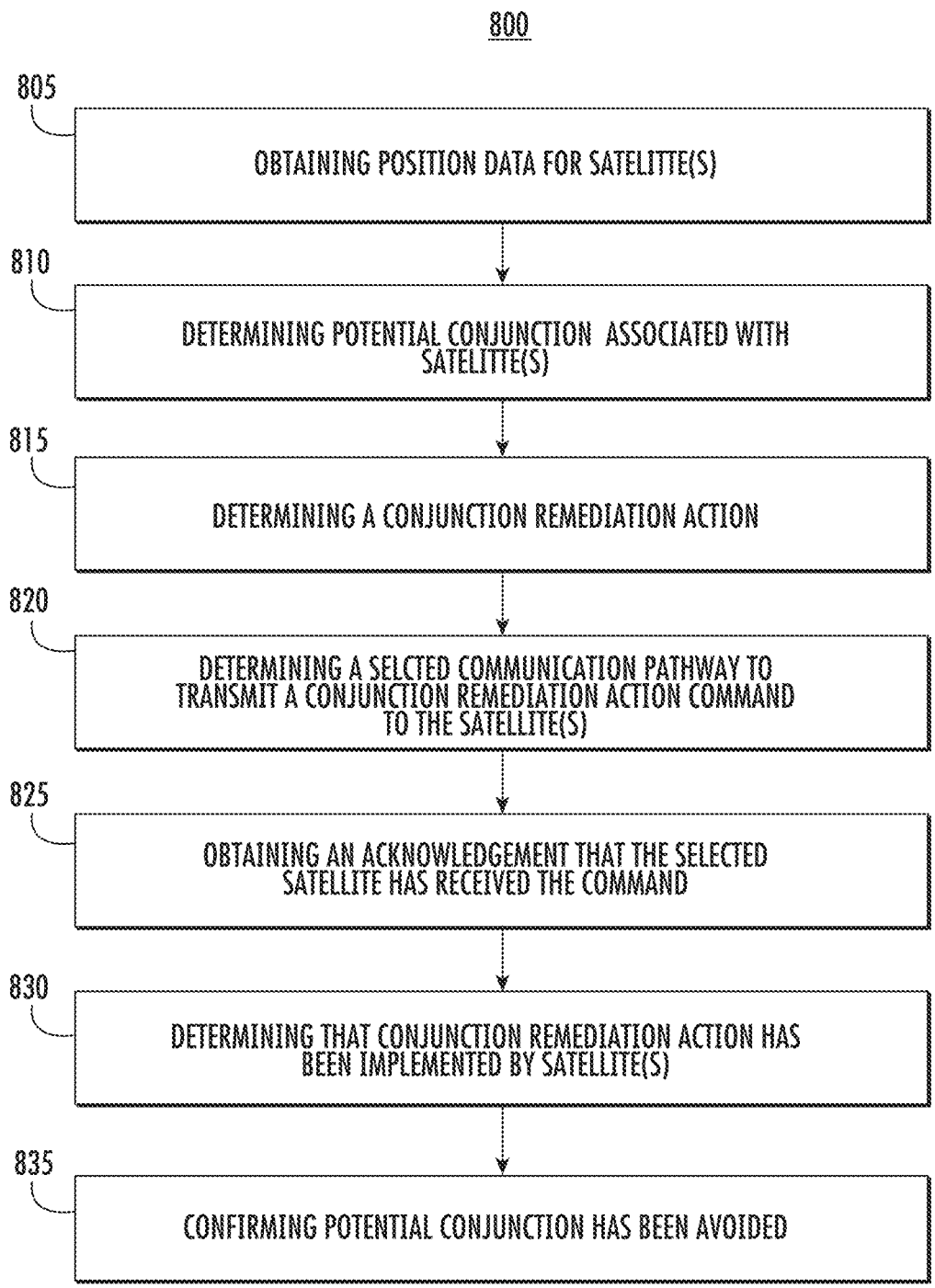
FIG. 8 depicts a flow diagram of an example method for satellite control for conjunction avoidance according to example embodiments of the present disclosure.

In some implementations, the systems and methods described herein can be utilized for conjunction avoidance and/or other short notice satellite orbit maneuvers. For instance, FIG. 8 depicts a flow diagram of an example method 800 for satellite control according to example embodiments of the present disclosure. In particular, the method 800 can be utilized for real-time satellite conjunction avoidance and/or other short term maneuver control. One or more portion(s) of the method 800 can be implemented by a computing system that includes one or more computing devices such as, for example, the computing systems described herein with reference to the other figures (e.g., a satellite command system 110, etc.). Each respective portion of the method 800 can be performed by any (or any combination) of one or more computing devices. Moreover, one or more portion(s) of the method 800 can be implemented as an algorithm on the hardware components of the device(s) described herein, for example, to control satellites (e.g., for conjunction avoidance). FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for example illustrated purposes and is not meant to be limiting. One or more portions of method 800 can be performed additionally, or alternatively, by other systems.

At (805), the method 800 can include obtaining position data for one or more satellites. For instance, the satellite command system 110 can obtain position data that is indicative of one or more past positions, one or more current positions, and/or one or more future positions of one or more satellites. The positions can be described as a position along an orbit/trajectory, coordinate, radial position, position relative to the earth/portion of the earth/base station/other reference point, and/or in another form that is indicative of satellite's position/location. The future position(s) of the satellite can be expressed as a projected/predicted position and/or a future satellite trajectory.

The satellite command system 110 can obtain satellite environmental data. The satellite environmental data can include, for example, data indicative of one or more other objects within space and/or the surrounding environment of the satellite. This can include other hardware/equipment orbiting the earth, other objects traveling in space (e.g., natural and artificial space debris, meteor, etc.), satellites of another entity, etc. The satellite environmental data can be indicative of the past, current, and/or future position(s) of these object(s). Such data can be acquired via monitoring equipment orbiting the earth and/or from a ground-based system/database that stores such information.

At (810), the method 800 can include determining a potential conjunction associated with the satellite(s). For instance, the satellite command system 110 (and/or another system in communication therewith) can determine that a first satellite may experience a potential conjunction with another object (e.g., another satellite, natural/artificial debris, equipment, etc.) based at least in part on the position data and/or the satellite environmental data. By way of example, the satellite command system 110 can use the position data and/or satellite environmental data to determine that the trajectories of the first satellite and another object may intersect.

At (815), the method 800 can include determining a conjunction remediation action. For instance, the satellite command 110 can determine a conjunction remediation action to prevent the potential conjunction associated with the satellite(s). By way of example, the conjunction remediation action can include a maneuver that can be performed by the first satellite in order for the satellite to re-position/alter (at least temporarily) its trajectory to avoid intersecting and/or colliding with another object (e.g., debris, a second satellite, etc.). The satellite can include one or more units (e.g., propulsion systems) by which the first satellite can alter its position (in response to the command). Additionally, or alternatively, the conjunction remediation action can include the re-positioning of the object that may be involved in the potential conjunction (e.g., a satellite command for the second satellite and/or orbiting equipment).

At (820), the method 800 can include determining a selected communication pathway to transmit a conjunction remediation action command to the satellite(s). For instance the satellite command system 110 can include determining a selected communication pathway to transmit a command indicative of the conjunction remediation action to the first satellite. By way of example, the satellite command system 110 can determine a selected communication pathway of a plurality of communication pathways 200A-C to transmit the conjunction remediation action command to the first satellite based at least in part on a priority of the command. As described herein, the plurality of communication pathways can include a first communication pathway 200A via which the image acquisition command 155 is sent directly to the selected satellite (e.g., the standard communication pathway). The plurality of communication pathways can include a second communication pathway 200B via which the conjunction remediation action command is indirectly communicated to the selected satellite via a geostationary satellite (e.g., the RT communication pathway). The plurality of communication pathways can include a third communication pathway 200C. The conjunction remediation action command can be considered of high priority due to the nature of the conjunction avoidance. In response, the satellite command system 110 can determine that the selected communication pathway is the second communication pathway via which the conjunction remediation action command is indirectly communicated to the selected satellite via a geostationary satellite 120. As described herein, this RT communication pathway can provide a near real-time persistent communication pathway that can allow for expediting the command and implementation of the conjunction remediation action.

In some implementations, at (825), the method 800 can include obtaining an acknowledgement that the selected satellite has received the command. For example, the satellite command system 110 can obtain an acknowledgement that the first satellite has received the command. The acknowledgment can include, for example, data that communicated to the satellite command system 110 via the RT communications pathway. In some implementations, no such acknowledgment may be sent.

At (830), the method 800 can include determining that the conjunction remediation action has been implemented by satellite(s). For instance, the satellite command system 110 can determine that the conjunction remediation action has been implemented by the first satellite to avoid the potential conjunction (e.g., collision with debris, etc.). This determination can be based at least in part on updated position data and/or satellite environmental data. The satellite command system 110 can confirm that the first satellite has implemented the conjunction remediation action by determining that the first satellite (and/or another object) has altered its position and/or trajectory based at least in part on the updated position data (and/or updated satellite environmental data).

At (835), the method 800 can include confirming that the potential conjunction has been avoided. For instance, the satellite command system 110 can confirm that the potential conjunction has been avoided based at least in part on the updated position data and/or satellite environmental data. By way of example, the satellite command system 110 can determined that the first satellite and an object with which it may potentially have collided with have passed one another without conjunction.

Figure 9:
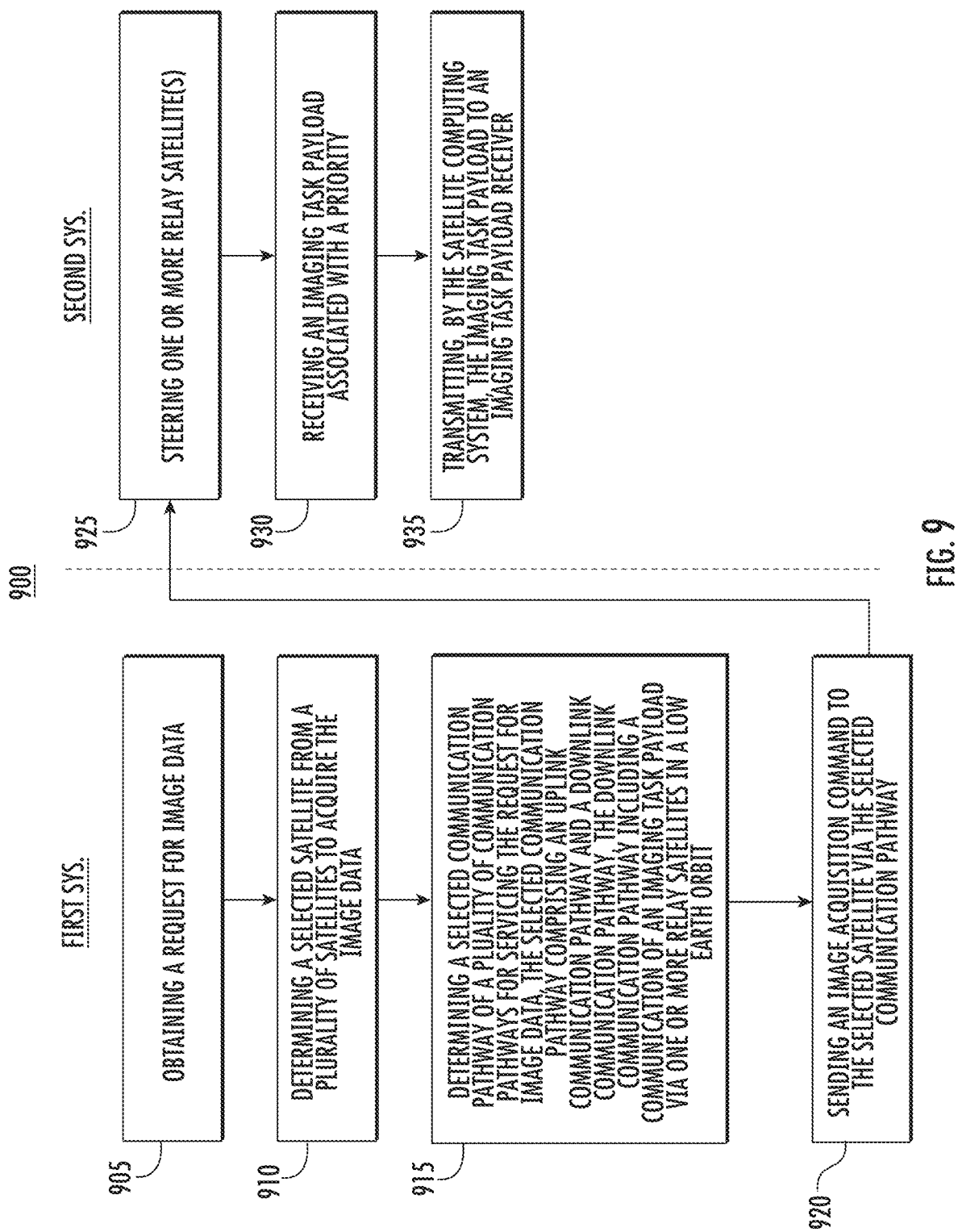
FIG. 9 depicts a flow diagram of an example method for satellite imaging according to example embodiments of the present disclosure.

FIG. 9 depicts a flow diagram of an example method 900 for satellite imaging according to example embodiments of the present disclosure. The method 900 can be performed by a plurality of systems including a first system and a second system. At (905), the method 900 can include obtaining a request for image data. For instance, the satellite command system 110 can obtain a request 140 for image data. As described herein, the request 140 can be submitted via a user device 105 that presents a user interface 145 for creating the request 140. The request 140 can be associated with a priority 150 for acquiring the image data. The priority can be specified by a user 130 and/or determined by the satellite command system 110, as described herein. The priority 150 can include, for example, a standard priority, an intermediate priority (e.g., a request to be scheduled ahead of standard requests), or a high priority (e.g., a request to be given a super priority that can initiate the utilization of a dedicated communication pathway).

At (910), the method 900 can include determining a selected imaging satellite from the plurality of satellites to acquire the image data. For instance, the satellite command system 110 can determine a selected satellite from the plurality of satellites 125 to acquire the image data based at least in part on an availability of the selected satellite to acquire the image data. By way of example, the satellite command system 110 can run an optimization algorithm to determine which satellite can acquire the requested image data with the lowest impact on the current pending requests and/or the satellite itself/fleet.

At (915), the method 900 can include determining a communication pathway of a plurality of communication pathways for servicing the request for image data. For example, the satellite command system 110 can determine a communication pathway of a plurality of communication pathways for servicing the request for image data. The selected communication pathway can include an uplink communication pathway (e.g., a standard uplink communication pathway, an RT communication pathway, an LEO relay communication pathway) and a downlink communication pathway (e.g., an LEO relay communication pathway).

At (920), the method 900 can include sending the image acquisition command to the selected imaging satellite via the selected communication pathway. For example, the satellite command system 110 can send the image acquisition command to the selected imaging satellite via the selected communication pathway.

In some implementations, at (925), the method 900 can include steering one or more relay satellites. For example, a satellite computing system (including one or more satellite computing system) can steer an antenna of a first relay satellite of the one or more relay satellites to maintain a line of communication with the imaging satellite (e.g., a first imaging satellite).

The satellite computing system can include one or more relay satellites in low earth orbit (e.g., LEO relay(s) 123) (and/or medium-earth orbit). The method 900 can also include steering the antenna of the first relay satellite to maintain a line of communication with a second imaging satellite. This can be accomplished via the transmission of steering commands (e.g., with location data, steering angles, coordinates, etc.) to the relay satellite(s). The relay satellites can activate one or more steering mechanisms to adjust the line of communication as instructed.

At (930), the method 900 can include receiving an imaging task payload associated with a priority. For example, the satellite computing system can receive an imaging task payload associated with a priority. The imaging task payload may have been generated responsive to an image acquisition command. The image acquisition command may have been transmitted to the imaging satellite via a communication pathway selected from a plurality of communication pathways at least in part based on the priority (e.g., the priority 150 associated with the underlying request 140), as described herein. The imaging task payload can include image data captured by the imaging satellite. The image task payload can be received, by the satellite computing system, from the imaging satellite. In some implementations, the imaging task payload can include one or more frames of a video recording.

At (935), the method 900 can include transmitting the imaging task payload to an imaging task payload receiver. For example, the satellite computing system (including the one or more relay satellites) can transmit the imaging task payload to an imaging task payload receiver (e.g., using a radio frequency and/or optical downlink). This can include transmitting the imaging task payload from a first relay satellite of the one or more relay satellites to a second relay satellite of the one or more relay satellites. In some implementations, the imaging task payload receiver can be a ground-based terminal.

In some implementations, the imaging task payload receiver can be associated with another satellite. For example, the image task payload can be captured via a first imaging satellite. A second imaging satellite can include the imaging task payload receiver. The imaging task payload can include instructions that, when executed by one or more processors of the second imaging satellite, cause the second imaging satellite to monitor an AOI and/or SOI monitored by the first imaging satellite (e.g., as requested by and/or otherwise indicated to be of interest to a user).

The imaging satellite, relay satellites, and/or ground-based terminal can be associated with a plurality of different parties. For example, the imaging satellite can be administered (e.g., coordinated, managed, owned, leased, controlled, etc.) by a first service entity. The first service entity can be an entity offering imaging services to user(s) and receiving requests for image data (e.g., including video data). The first service entity may also be the entity that delivers the requested image data to the user. The ground-based terminal can be associated with a third-party service entity. This can include an entity that administers another constellation of satellites. For example, the third-party service entity can be an entity that administers the one or more relay satellites (e.g., LEO relays, MEO relays, etc.). In one embodiment, the ground-based terminal can comprise a portable system (e.g., a vehicle-mounted system, ship-mounted system, human, carried system, etc.).

Figure 10:
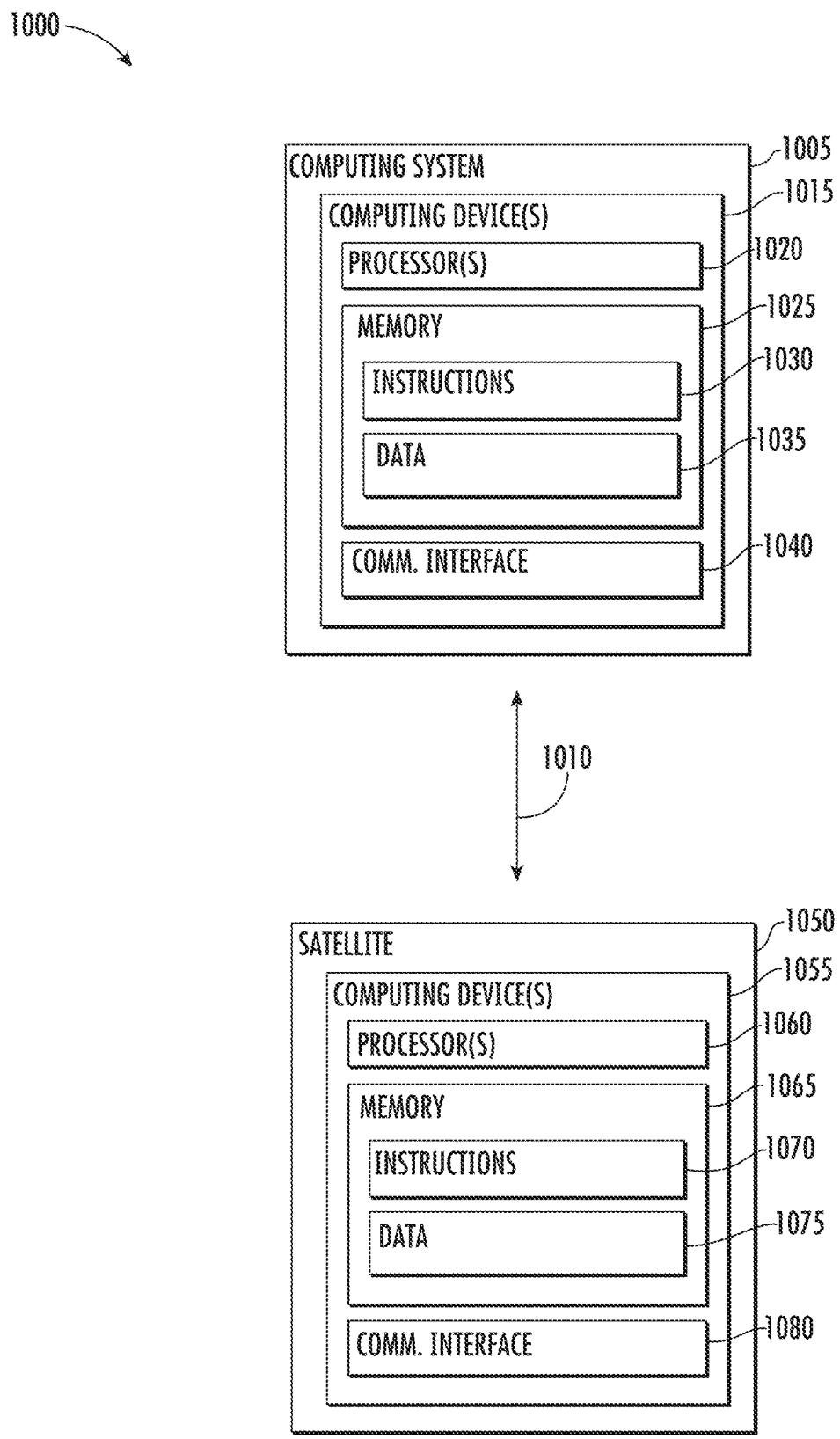
FIG. 10 depicts example system components according to example embodiments of the present disclosure.

FIG. 10 depicts an example computing system 1000 that can be used to implement the methods and systems according to example aspects of the present disclosure. The system 1000 can include computing system 1005 and satellite 1055, which can communicate with one another using transmission signals 1010 (e.g., radio frequency transmissions). The system 1000 can be implemented using a client-server architecture and/or other suitable architectures. The transmission signals 1010 can comprise communications along any one of, subset of, or all of communication pathways 200A, 200B, and 200C.

The computing system 1005 can correspond to any of the systems described herein (e.g., satellite command system 110, GEO hub 115, etc.). Computing system 1005 can include one or more computing device(s) 1015. Computing device(s) 1015 can include one or more processor(s) 1020 and one or more memory device(s) 1025. Computing device(s) 1015 can also include a communication interface 1040 used to communicate with satellite 1050 and/or another computing system/device. Communication interface 1040 can include any suitable components for communicating with satellite 1050 and/or another system/device, including for example, transmitters, receivers, ports, controllers, antennas, or other suitable components.

Processor(s) 1020 can include any suitable processing device, such as a microprocessor, microcontroller, integrated circuit, logic device, or other suitable processing device. Memory device(s) 1025 can include one or more computer-readable media, including, but not limited to, non-transitory computer-readable media, RAM, ROM, hard drives, flash drives, or other memory devices. Memory device(s) 1025 can store information accessible by processor(s) 1020, including computer-readable instructions 1030 that can be executed by processor(s) 1020. Instructions 1030 can be any set of instructions that when executed by processor(s) 1020, cause one or more processor(s) 1020 to perform operations. For instance, execution of instructions 1030 can cause processor(s) 1020 to perform any of the operations and/or functions for which computing device(s) 1015 and/or computing system 1005 are configured (e.g., such as the functions of the satellite command system 110, the user device 135, the GEO hub 115, etc.). In some implementations, execution of instructions 1030 can cause processor(s) 1020 to perform, at least a portion of, methods 600 and/or 800 according to example embodiments of the present disclosure.

As shown in FIG. 10, memory device(s) 1025 can also store data 1035 that can be retrieved, manipulated, created, or stored by processor(s) 1020. Data 1035 can include, for instance, any other data and/or information described herein. Data 1035 can be stored in one or more database(s). The one or more database(s) can be connected to computing device(s) 1015 by a high bandwidth LAN or WAN, or can also be connected to computing device(s) 1015 through various other suitable networks. The one or more databases can be split up so that they are located in multiple locales.

Computing system 1005 can exchange data with satellite 1050 using signals 1010. Although one satellite 1050 is illustrated in FIG. 10, any number of satellites can be configured to communicate with the computing system 1005. In some implementations, satellite 1050 can be associated with any suitable type of satellite system, including satellites, mini-satellites, micro-satellites, nano-satellites, etc. Satellite 1050 can correspond to any of the satellites described herein (e.g., geostationary satellite 120, satellite 125, etc.).

Satellite 1050 can include computing device(s) 1055, which can include one or more processor(s) 1060 and one or more memory device(s) 1060. Processor(s) 1060 can include one or more central processing units (CPUs), graphical processing units (GPUs), and/or other types of processors. Memory device(s) 1065 can include one or more computer-readable media and can store information accessible by processor(s) 1060, including instructions 1070 that can be executed by processor(s) 1060. For instance, memory device(s) 1065 can store instructions 1070 for implementing a command receive and image collect for capture image data; storing image data, commands, tracks, etc.; transmitting the image data to a remote computing device (e.g., computing system 1005). In some implementations, execution of instructions 1065 can cause processor(s) 1060 to perform any of the operations and/or functions for which satellite 125 and/or geostationary satellite 120 is configured. In some implementations, execution of instructions 1070 can cause processor(s) 1060 to perform, at least a portion of, method 600 and/or 800.

Memory device(s) 1065 can also store data 1075 that can be retrieved, manipulated, created, or stored by processor(s) 1060. Data 1075 can include, for instance, image acquisition commands, tracks, sequences, position data, data associated with the satellite, image data, and/or any other data and/or information described herein. Data 1075 can be stored in one or more database(s). The one or more database(s) can be connected to computing device(s) 1055 by a high bandwidth LAN or WAN, or can also be connected to computing device(s) 1055 through various other suitable networks. The one or more database(s) can be split up so that they are located in multiple locales.

Satellite 1050 can also include a communication interface 1080 used to communicate with one or more remote computing device(s) (e.g., computing system 1005, geostationary satellite(s), etc.) using signals 1010. Communication interface 1080 can include any suitable components for interfacing with one or more remote computing device(s), including for example, transmitters, receivers, ports, controllers, antennas, or other suitable components.

In some implementations, one or more aspect(s) of communication among the components of system 1000 can involve communication through a network. In such implementations, the network can be any type of communications network, such as a local area network (e.g. intranet), wide area network (e.g. Internet), cellular network, or some combination thereof. The network can also include a direct connection, for instance, between one or more of the components. In general, communication through the network can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In one embodiment, the satellite 1050 can be an imaging satellite (e.g., imaging satellite 125). In one embodiment, the satellite 1050 can process one or more images (e.g., stored as data 1075 in the memory 1065) using the computing device(s) 1055 to determine if an SOI is depicted within the image data. For instance, in one embodiment, one or more onboard computing devices 1055 of the satellite(s) 1050 can process image data with one or more image recognition models to determine a probability that an SOI is depicted therein. In some embodiments, based on the probability determined, the satellite(s) 1050 can identify the SOI and capture images thereof.

In one embodiment, the computing device(s) 1055 can perform pre-processing on image data stored in the memory 1065 with a first image recognition model to determine a probability that an SOI is depicted thereby. Based on the probability determined, the satellite(s) 1055 can transmit at least a portion of the image data to another computing system for further processing. For instance, in one embodiment, the satellite(s) 1055 can transmit at least a portion of the image data likely to contain the SOI via signals 1010 to a computing system 1005. For instance, the image data can be comprised in an imaging task payload relayed by one or more LEO relay satellites to an imaging task payload receiver associated with or otherwise in communication with the computing system 1005. The computing system 1005 can then perform additional processing on the image data using a second image recognition model (and optionally multiple additional models) to obtain additional information about the image. For instance, in one embodiment, the computing system 1005 can be a ground-based system with increased access to high-power processing, large data storage capacities, and/or low-latency network connections. In some embodiments, however, the computing system 1005 can be onboard another satellite which may have additional processing bandwidth and/or other capacity to process the imaging task payload. In this manner, the computing system 1005 may be able to recognize additional aspects of the image data not resolved by the pre-processing. Based on this further processing, the computing system 1005 can communicate with the satellite 1050 via signals 1010 to confirm, correct, and/or otherwise supplement the operations of the satellite 1050. For instance, the satellite 1050 may recognize that an object within a category of SOIs is depicted within image data captured by the satellite 1050 (or optionally image data captured by another satellite, in some embodiments), whereas the computing system 1005 may additionally be able to identify the object as a specific SOI indicated in an image acquisition command and provide additional instructions to the satellite 1050 to proceed with imaging of the object.

Although the above examples are discussed in the context of a single satellite 1050, it is to be understood that a plurality of satellites 1050 can similarly correspond with one or more computing systems 1005 via signals 1010. In some embodiments, recognized SOIs can be imaged by a plurality of satellites 1050, as a first satellite 1050 can recognize the SOI (e.g., independently or cooperatively with the computing system 1005) and relay image data and/or image acquisition commands in an imaging task payload to one or more other satellite(s) 1050.

For instance, in one embodiment, a plurality of satellites 1050 can perform an autonomous "tip and cue" operation. An imaging satellite 1050 that acquires an image of a region could extract, for example, information from the image and identify SOIs autonomously (e.g., without an operator or ground involvement). The satellite 1050 can then "tip and cue" to another satellite 1050 which is positioned or is scheduled to be positioned to capture further images of the SOI(s). In one example application, for instance, if a satellite 1050 has detected one or more ships in a region (e.g., a region identified as an AOI due to, for instance, shipping and/or fishing activity restrictions), the satellite 1050 can "tip and cue" to another satellite for further imaging and/or sensing tasks by transmitting an imaging task payload via one or more relay networks. For instance, in addition or in alternative to imaging sensors, the other satellite could comprise systems for engaging with automatic identification system (AIS) networks and/or search and rescue (SAR) networks for ship identification.

Additional Disclosure

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server or ground station can instead be performed at a user device. Likewise, computing tasks discussed herein as being performed at the user device can instead be performed at the server or ground station.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for satellite imaging, the method comprising:
   receiving, at a low-earth orbit satellite, a command to capture imagery data of an image target comprising a geographic area on earth;
   acquiring, using the low-earth orbit satellite, the imagery data of the image target;
   determining that a low-latency downlink communication pathway provides a quicker downlink speed than a direct downlink communication pathway; and
   selecting the low-latency downlink communication pathway based on determining that the low-latency downlink communication pathway provides a quicker downlink speed than the direct downlink communication pathway; and
   transmitting, via the low-latency downlink communication pathway, the imagery data to a geostationary relay satellite, wherein the low-latency downlink communication pathway comprises optical transmission of the imagery data.

2. The computer-implemented method of claim 1, further comprising:
   selecting the low-latency downlink communication pathway from a plurality of downlink communication pathways for transmitting the imagery data from the low-earth orbit satellite, wherein the plurality of downlink communication pathways comprises the direct downlink communication pathway and the low-latency downlink communication pathway, wherein the direct downlink communication pathway comprises communication directly between the low-earth orbit satellite and a ground-based station.

3. The computer-implemented method of claim 2, wherein the direct downlink communication pathway comprises radio frequency transmission.

4. The computer-implemented method of claim 1, wherein the low-latency downlink communication pathway is configured to transmit the imagery data to one or more geostationary hubs on earth, and wherein the direct downlink communication pathway is configured to transmit the imagery data to a ground-based station.

5. The computer-implemented method of claim 1, further comprising:
   determining that the command to capture imagery data is high priority; and
   selecting the low-latency downlink communication pathway based on determining that the command to capture imagery data is high priority.

6. The computer-implemented method of claim 1, wherein receiving the command to capture imagery data of the image target is via a direct uplink communication pathway comprising communication directly between the low-earth orbit satellite and a ground-based station.

7. The computer-implemented method of claim 6, wherein the direct uplink communication pathway comprises radio frequency transmission.

8. The computer-implemented method of claim 1, wherein a controlling entity of the geostationary relay satellite is different from a controlling entity of the low-earth orbit satellite.

9. The computer-implemented method of claim 1, wherein a communication pathway between the low-earth orbit satellite and the geostationary relay satellite is configured to be in continual readiness for transmissions over a period of time.

10. The computer-implemented method of claim 1, wherein a communication pathway between the low-earth orbit satellite and the geostationary relay satellite is configured to be open according to a schedule.

11. A computing system comprising:
   one or more processors; and
   one or more tangible, non-transitory, computer readable media that store instructions that, when executed by the one or more processors, cause the computing system to perform operations comprising:
   receiving, at a low-earth orbit satellite, a command to capture imagery data of an image target comprising a geographic area on earth, acquiring, using the low-earth orbit satellite, the imagery data of the image target;

determining that a low-latency downlink communication pathway provides a quicker downlink speed than a direct downlink communication pathway; and selecting the low-latency downlink communication pathway based on determining that the low-latency downlink communication pathway provides a quicker downlink speed than the direct downlink communication pathway; and transmitting, via a low-latency downlink communication pathway, the imagery data to a geostationary relay satellite, wherein the low-latency downlink communication pathway comprises optical transmission to a geostationary relay satellite.

12. The computing system of claim 11, wherein the instructions, when executed by the one or more processors, cause the computing system to perform operations further comprising:

determining a current orbital position of the low-earth orbit satellite, wherein transmitting the imagery data to the geostationary relay satellite via the low-latency downlink communication pathway is based on determining the current orbital position of the low-earth orbit satellite.

13. The computing system of claim 11, wherein the instructions, when executed by the one or more processors, cause the computing system to perform operations further comprising:

a selecting the low-latency downlink communication pathway from a plurality of downlink communication pathways, the plurality of downlink communication pathways comprising the direct downlink communication pathway and the low-latency downlink communication pathway, wherein the direct downlink communication pathway comprises communication directly between the low-earth orbit satellite and a ground-based station, wherein transmitting the imagery data to the geostationary relay satellite via the low-latency downlink communication pathway is based on selecting the low-latency downlink communication pathway.

14. The computing system of claim 13, wherein the direct downlink communication pathway comprises radio frequency transmission.

15. The computing system of claim 11, wherein a destination for the low-latency downlink communication pathway is a geostationary hub on earth, and wherein the destination for the direct downlink communication pathway is a ground-based station.

16. The computing system of claim 11, further comprising:

determining that the command to capture imagery data is high priority; and selecting the low-latency downlink communication pathway based on determining that the command to capture imagery data is high priority.

17. A computer-implemented method for satellite imaging, the method comprising:

receiving, at a first low-earth orbit satellite, a first command to capture first imagery data of a target;

acquiring, using the first low-earth orbit satellite, the first imagery data of the target;

receiving, at a second low-earth orbit satellite, a second command to capture second imagery data of the target;

acquiring, using the second low-earth orbit satellite, the second imagery data of the target;

determining that a low-latency downlink communication pathway provides a quicker downlink speed than a direct downlink communication pathway; and selecting the low-latency downlink communication pathway based on determining that the low-latency downlink communication pathway provides a quicker downlink speed than the direct downlink communication pathway; and transmitting, via optical transmission from at least one of the first or second low-earth orbit satellites, the respective first or second imagery data to a geostationary relay satellite.

18. The computer-implemented method of claim 17, further comprising determining a current orbital position of at least one of the first or second low-earth orbit satellites, wherein transmitting the respective first or second imagery data to the geostationary relay satellite via optical transmission is based on determining the current orbital position of the low-earth orbit satellite.

19. The computer-implemented method of claim 17, wherein transmitting the respective first or second imagery data to the geostationary relay satellite comprises selecting the at least one of the first or second low-earth orbit satellites based on a downlink speed associated with the at least one of the first or second low-earth orbit satellites.

20. The computer-implemented method of claim 17, further comprising selecting, based on a current orbital position of the at least one of the first or second low-earth orbit satellites, the low-latency downlink communication pathway for transmitting the respective first or second imagery data from the low-earth orbit satellite.

* * * * *